(12) United States Patent
Jeong

(10) Patent No.: US 10,598,405 B2
(45) Date of Patent: *Mar. 24, 2020

(54) HEAT EXCHANGER

(71) Applicant: KYUNGDONG NAVIEN CO., LTD., Pyeongtaek-si, Gyeonggi-do (KR)

(72) Inventor: Inchul Jeong, Seoul (KR)

(73) Assignee: KYUNGDONG NAVIEN CO., LTD., Pyeongtaek-si (KR)

( * ) Notice: Subject to any disclaimer, the term of this patent is extended or adjusted under 35 U.S.C. 154(b) by 165 days.

This patent is subject to a terminal disclaimer.

(21) Appl. No.: 15/752,158

(22) PCT Filed: Aug. 11, 2016

(86) PCT No.: PCT/KR2016/008845
§ 371 (c)(1),
(2) Date: Feb. 12, 2018

(87) PCT Pub. No.: WO2017/039173
PCT Pub. Date: Mar. 9, 2017

(65) Prior Publication Data
US 2018/0238585 A1 Aug. 23, 2018

(30) Foreign Application Priority Data
Aug. 28, 2015 (KR) ........................ 10-2015-0121959

(51) Int. Cl.
*F24H 1/34* (2006.01)
*F28D 9/00* (2006.01)
(Continued)

(52) U.S. Cl.
CPC ................ *F24H 1/34* (2013.01); *F24H 1/30* (2013.01); *F24H 1/32* (2013.01); *F24H 1/44* (2013.01);
(Continued)

(58) Field of Classification Search
CPC ........ F24H 1/34; F24H 9/0005; F24H 9/0015; F28D 9/005; F28D 20/02; F28D 21/0007; F28F 3/025; F28F 3/046
See application file for complete search history.

(56) References Cited

U.S. PATENT DOCUMENTS

2018/0231274 A1* 8/2018 Jeong ........................ F24H 1/34

FOREIGN PATENT DOCUMENTS

| JP | 2001-99590 A | 4/2001 |
|---|---|---|
| JP | 2006-214628 A | 8/2006 |

(Continued)

*Primary Examiner* — Marc E Norman
(74) *Attorney, Agent, or Firm* — Stein IP, LLC

(57) ABSTRACT

A heat exchanger according to the present invention comprises a heat exchange portion in which heating medium flow paths, where a heating medium flows through a space between a plurality of plates, and combustion gas flow paths through which a combustion gas combusted in a burner flows are adjacently and alternatingly formed, wherein the heat exchange portion comprises a sensible heat portion, which surrounds the outside of a combustion chamber and comprises an area on one side of the plates, for heating the heating medium using the sensible heat of the combustion gas generated by combustion of the burner, and a latent heat portion, which comprises an area on the other side of the plates, for heating the heating medium using the latent heat of water vapors in the combustion gas which has completed heat exchanging in the sensible heat portion, wherein a connection passage for the heating medium is formed between the sensible heat portion and the latent heat portion, the latent heat portion comprises a heating medium inlet through which the heating medium is introduced, and a plurality of latent heat portion heating medium flow paths which are formed between the plurality of plates and communicate with the heating medium inlet in parallel, and wherein the sensible heat portion comprises a heating (Continued)

medium outlet through which the heating medium is discharged, and a plurality of sensible heat portion heating medium flow paths which are formed between the plurality of plates and are connected serially between the latent heat portion heating medium flow paths and the heating medium outlet.

13 Claims, 20 Drawing Sheets

(51) Int. Cl.
| | |
|---|---|
| *F28D 20/02* | (2006.01) |
| *F28F 3/00* | (2006.01) |
| *F28F 3/04* | (2006.01) |
| *F28D 21/00* | (2006.01) |
| *F24H 1/44* | (2006.01) |
| *F24H 8/00* | (2006.01) |
| *F24H 1/30* | (2006.01) |
| *F24H 1/32* | (2006.01) |
| *F24H 9/00* | (2006.01) |
| *F28F 3/02* | (2006.01) |

(52) U.S. Cl.
CPC ............... *F24H 1/445* (2013.01); *F24H 8/00* (2013.01); *F28D 9/00* (2013.01); *F28D 20/02* (2013.01); *F28D 21/00* (2013.01); *F28F 3/00* (2013.01); *F28F 3/04* (2013.01); *F24H 9/0015* (2013.01); *F28D 9/005* (2013.01); *F28D 21/0007* (2013.01); *F28F 3/025* (2013.01); *F28F 3/046* (2013.01)

(56) References Cited

FOREIGN PATENT DOCUMENTS

| | | |
|---|---|---|
| KR | 10-0424854 B1 | 4/2001 |
| KR | 10-2011-0083195 A | 7/2011 |
| KR | 10-2012-0045249 A | 5/2012 |
| KR | 10-2013-0052912 A | 5/2013 |
| KR | 10-1389465 B1 | 4/2014 |
| WO | WO 2008/107760 A2 | 9/2008 |
| WO | WO 2015/142003 A1 | 9/2015 |

* cited by examiner

[FIG. 1]
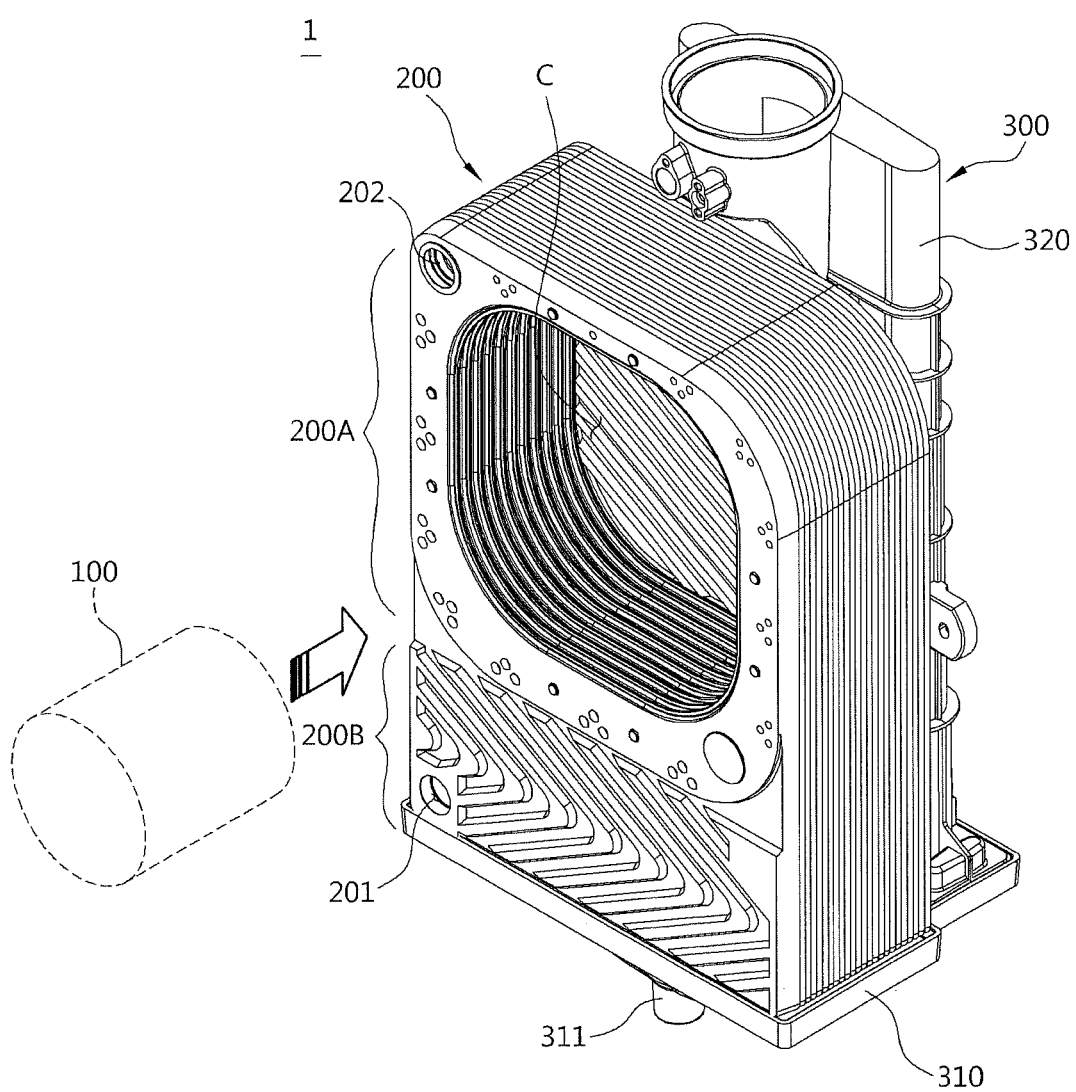

[FIG. 2]
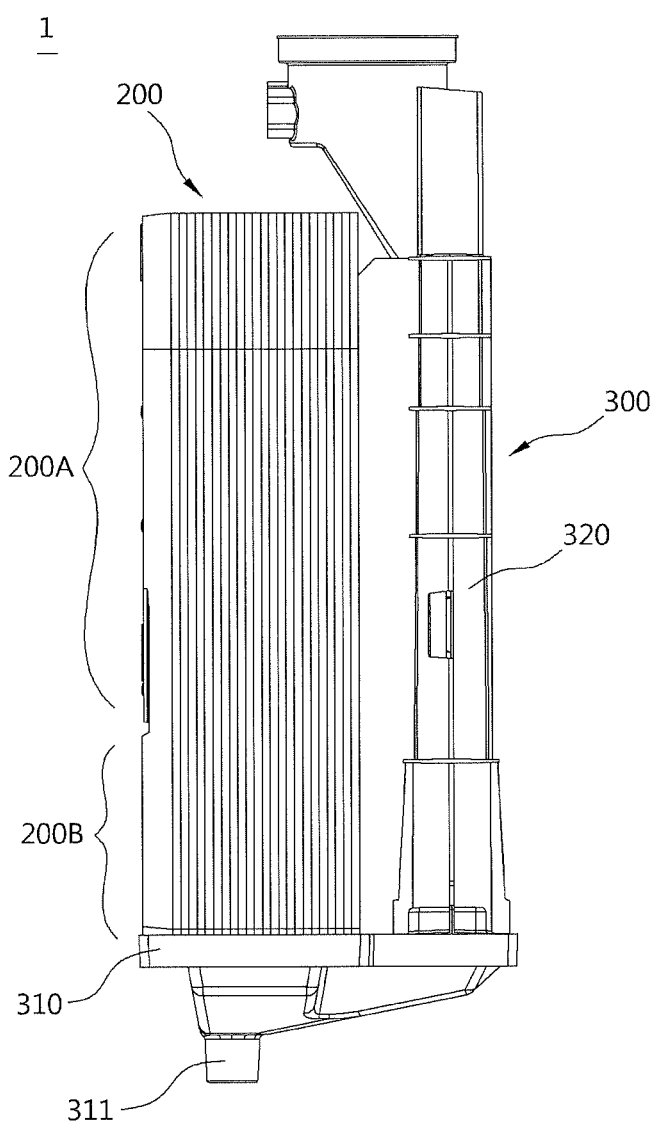

[FIG. 3]
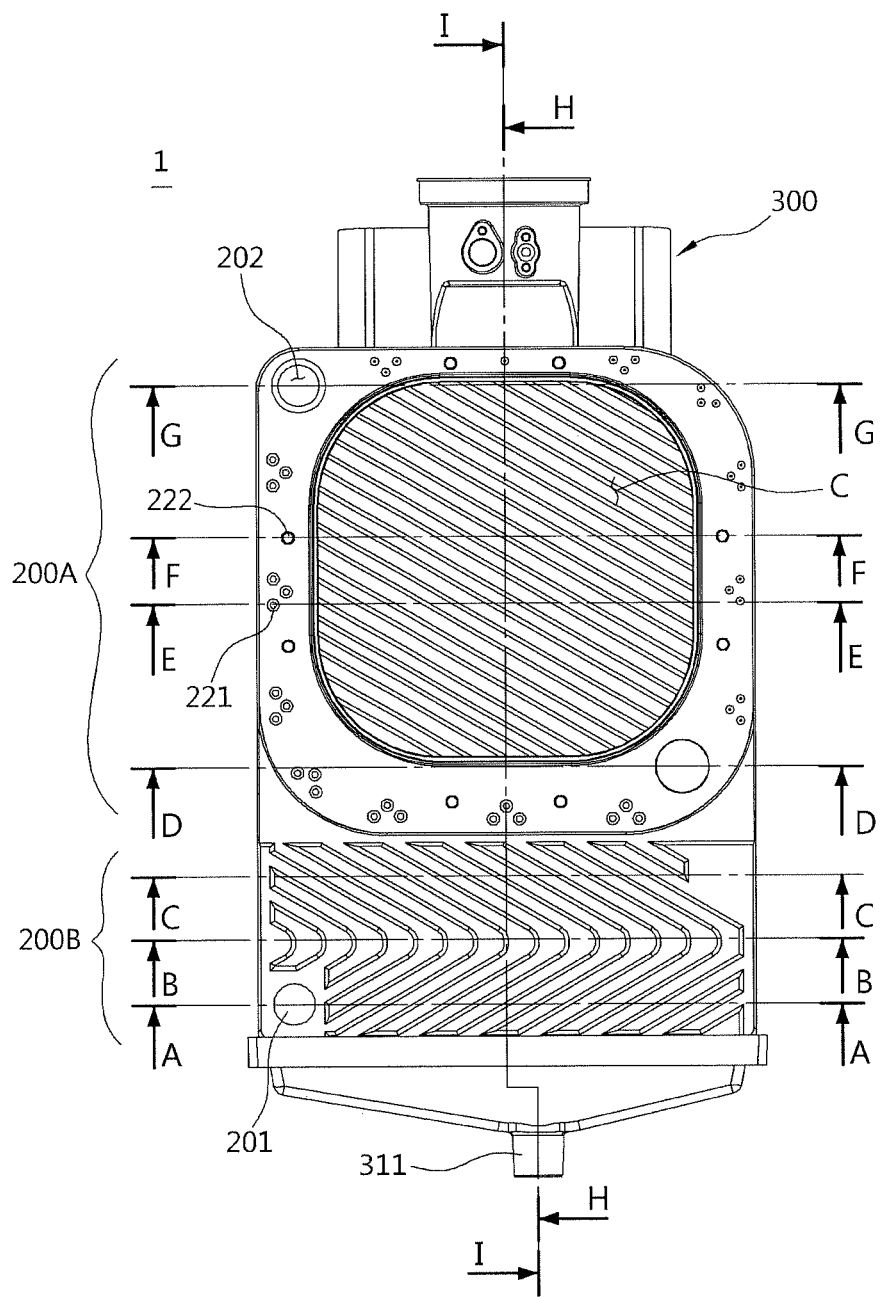

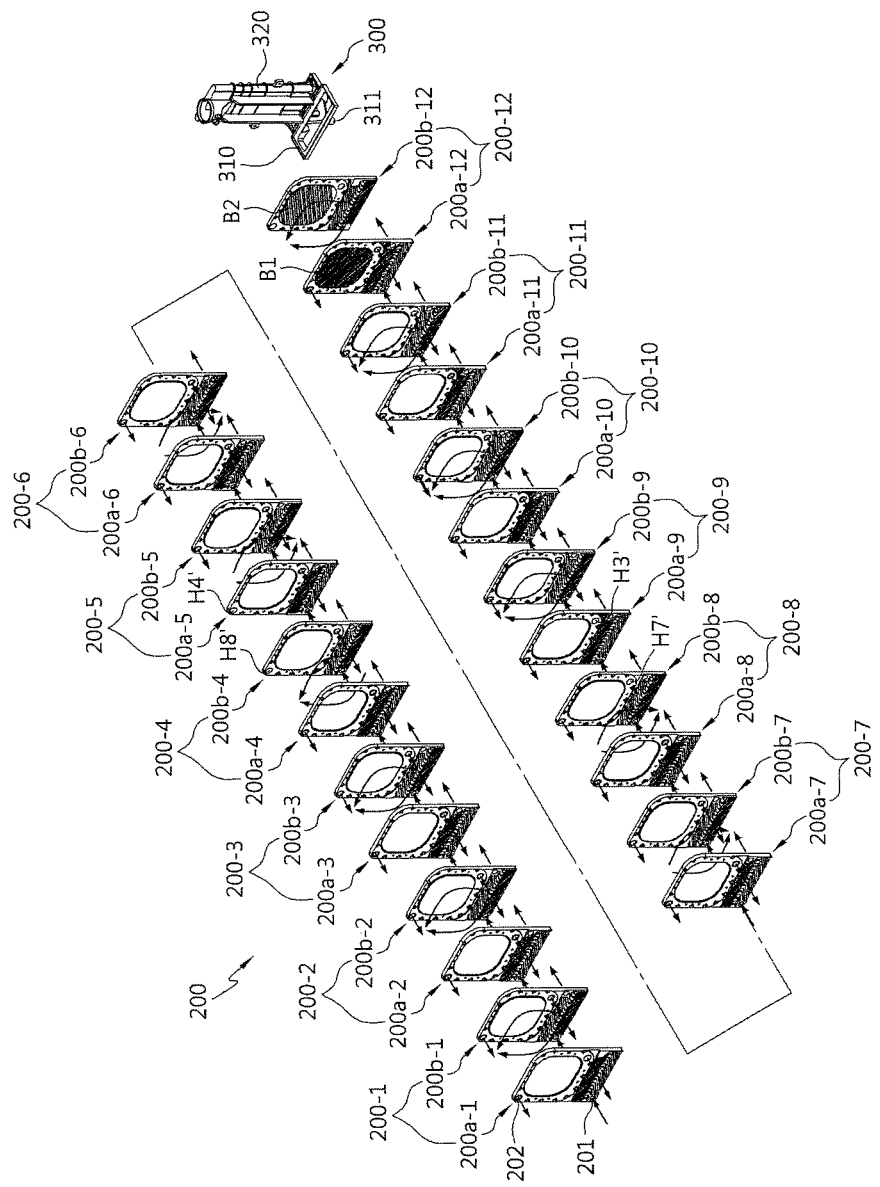
[FIG. 4]

[FIG. 5]
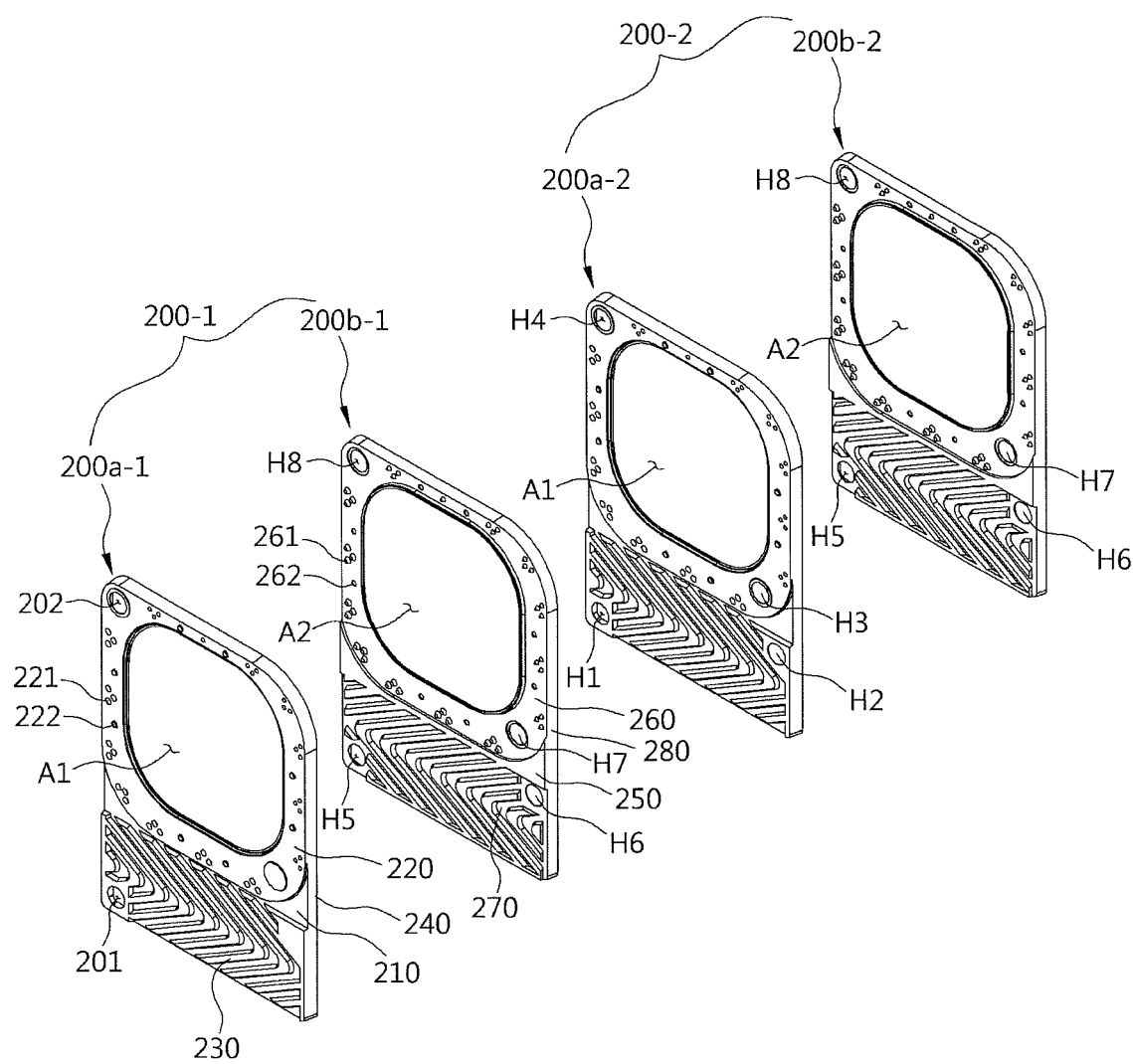

【FIG. 6】
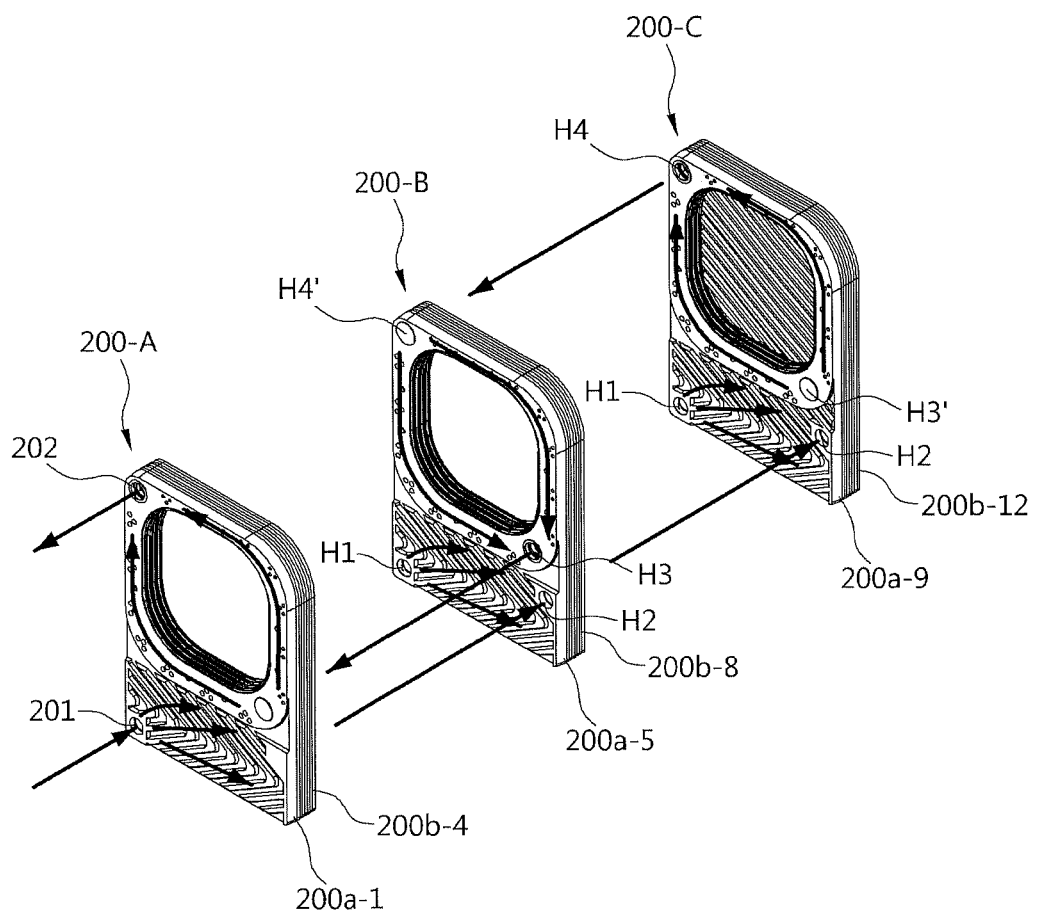

[FIG. 7]
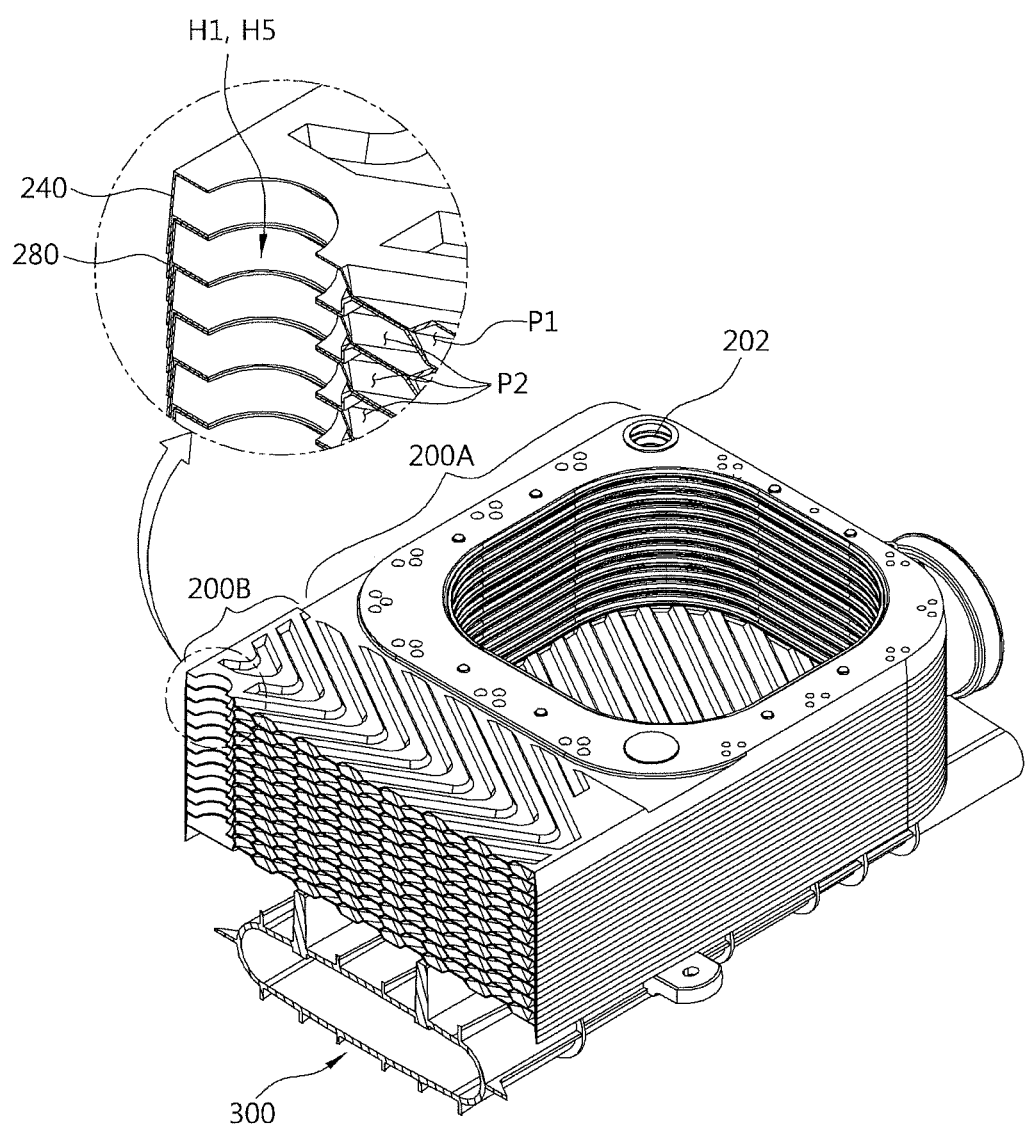

【FIG. 8】
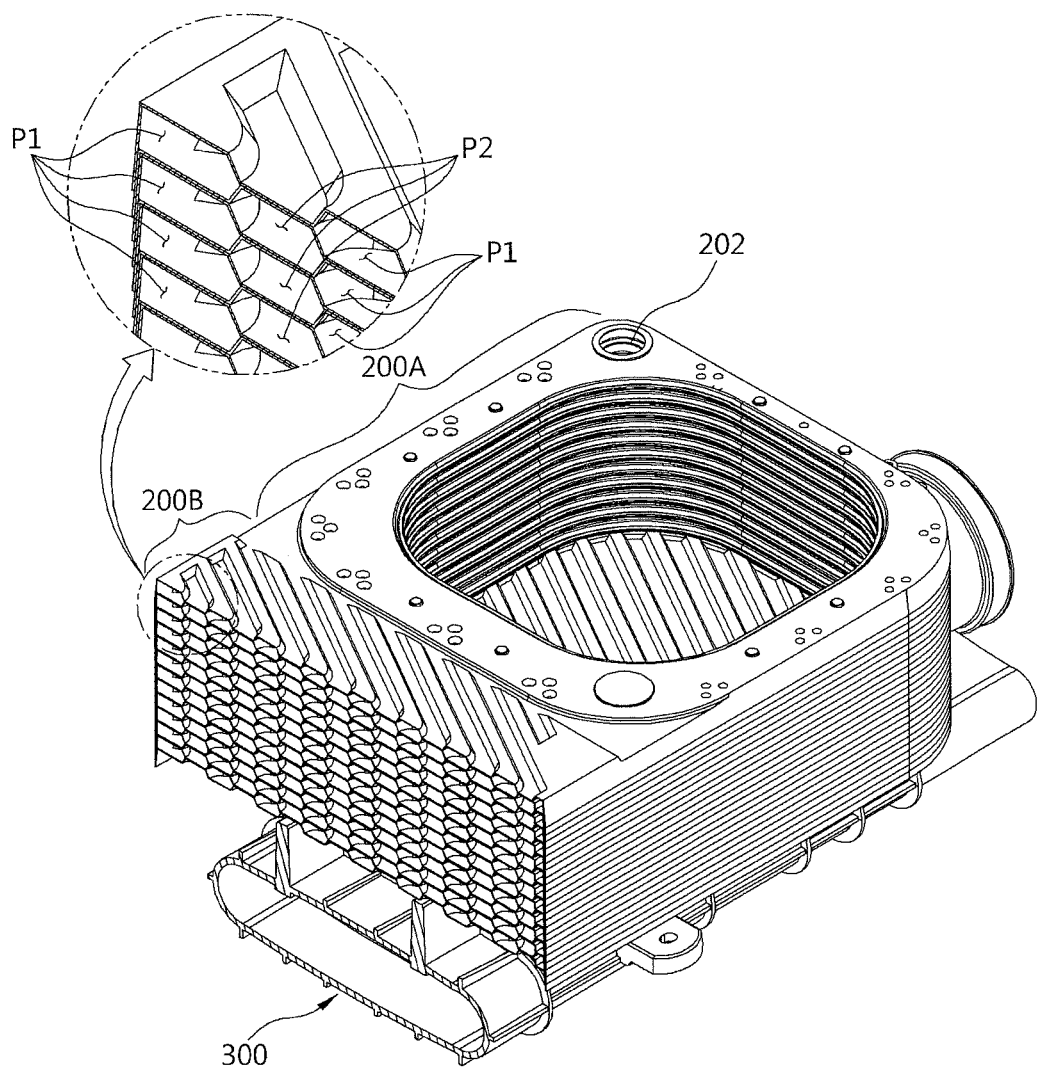

【FIG. 9】
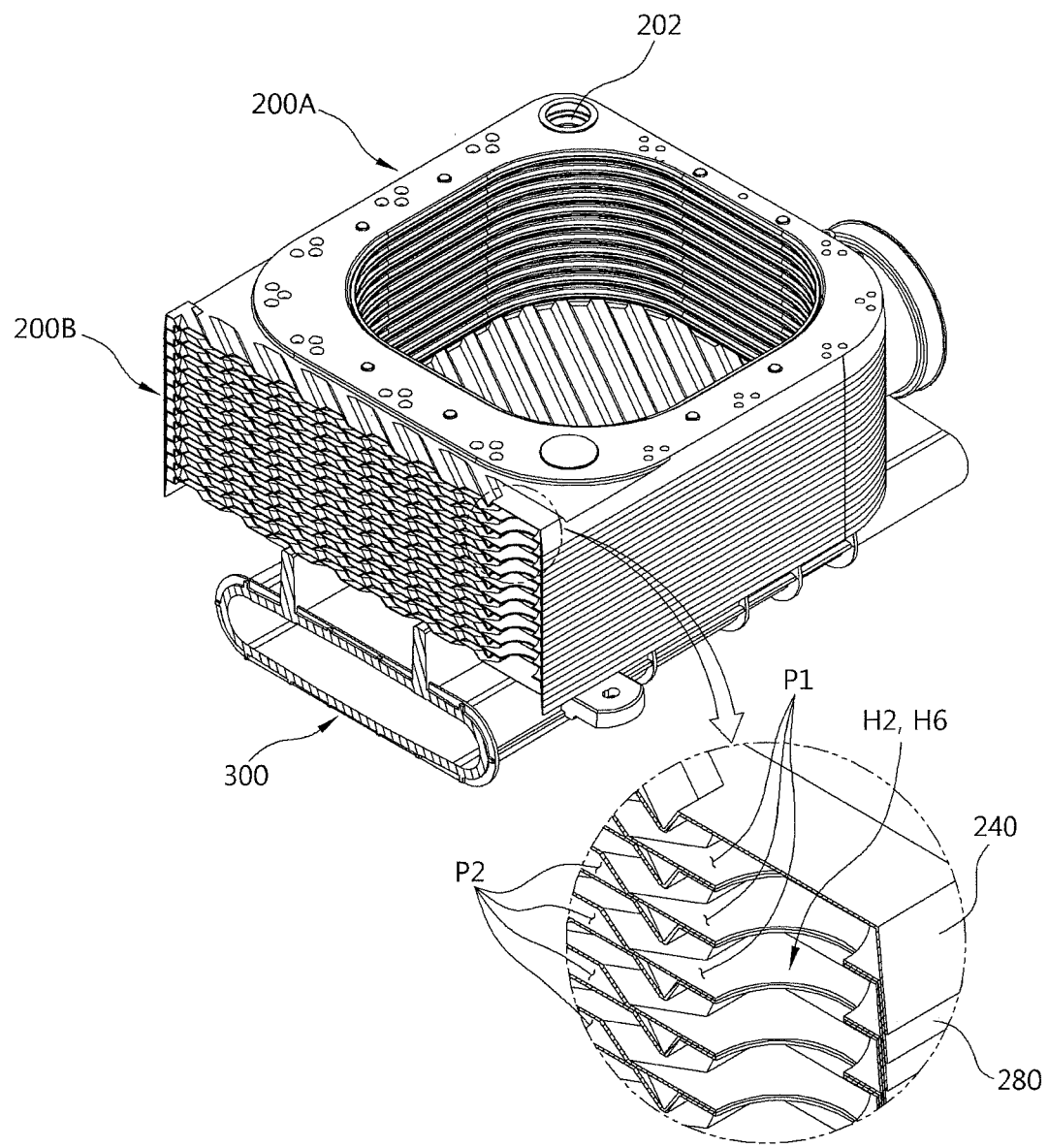

[FIG. 10]
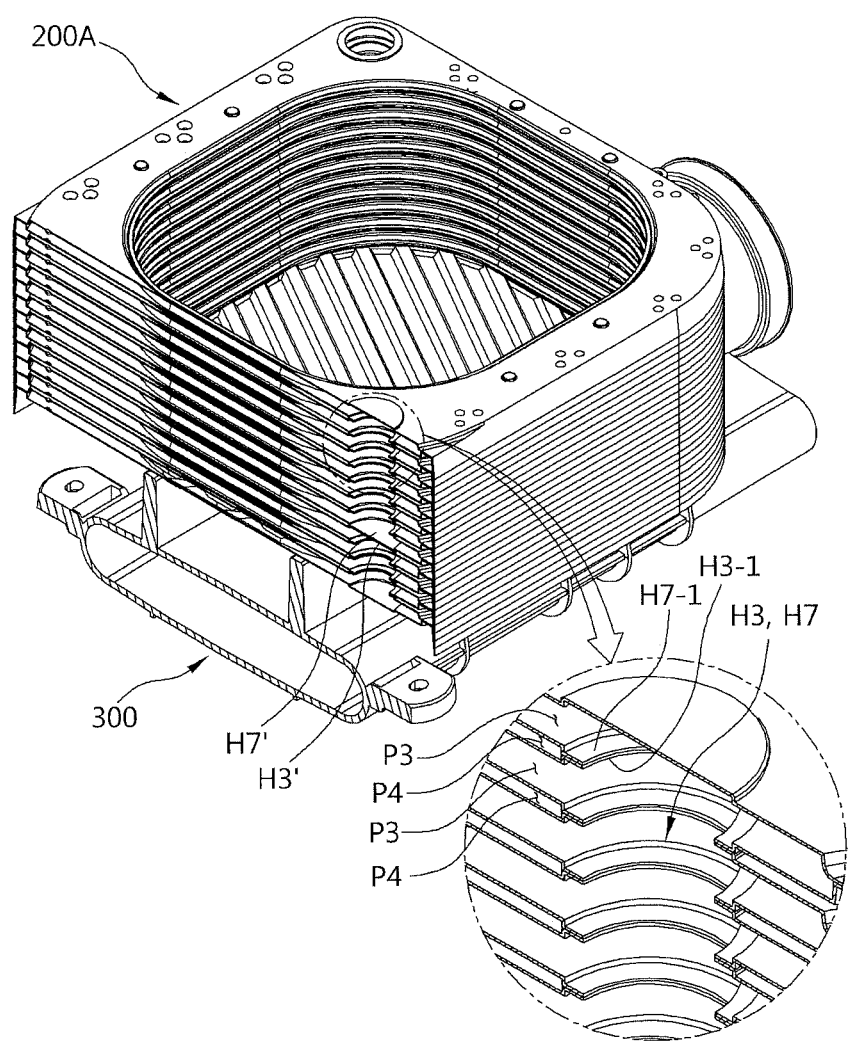

[FIG. 11]
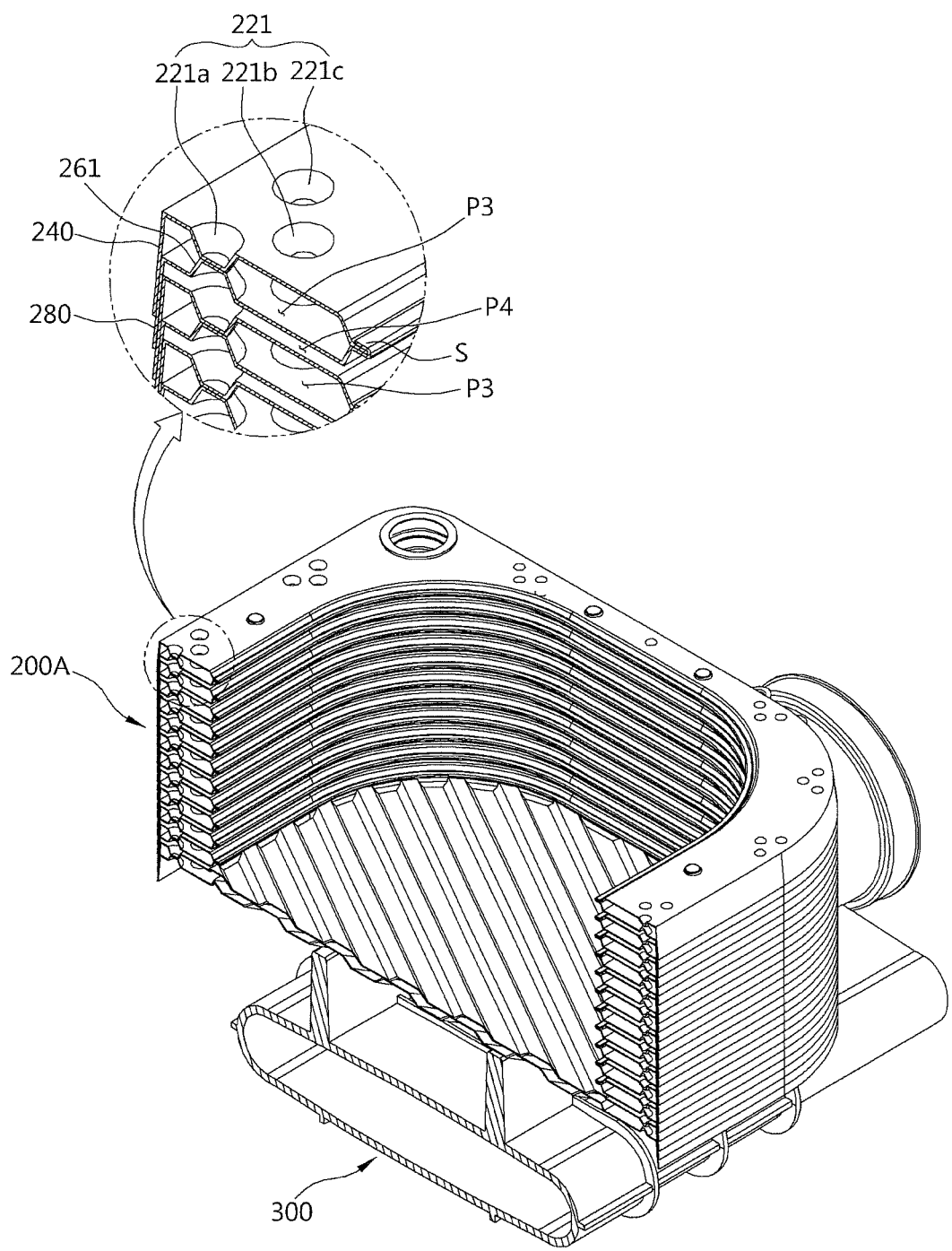

[FIG. 12]
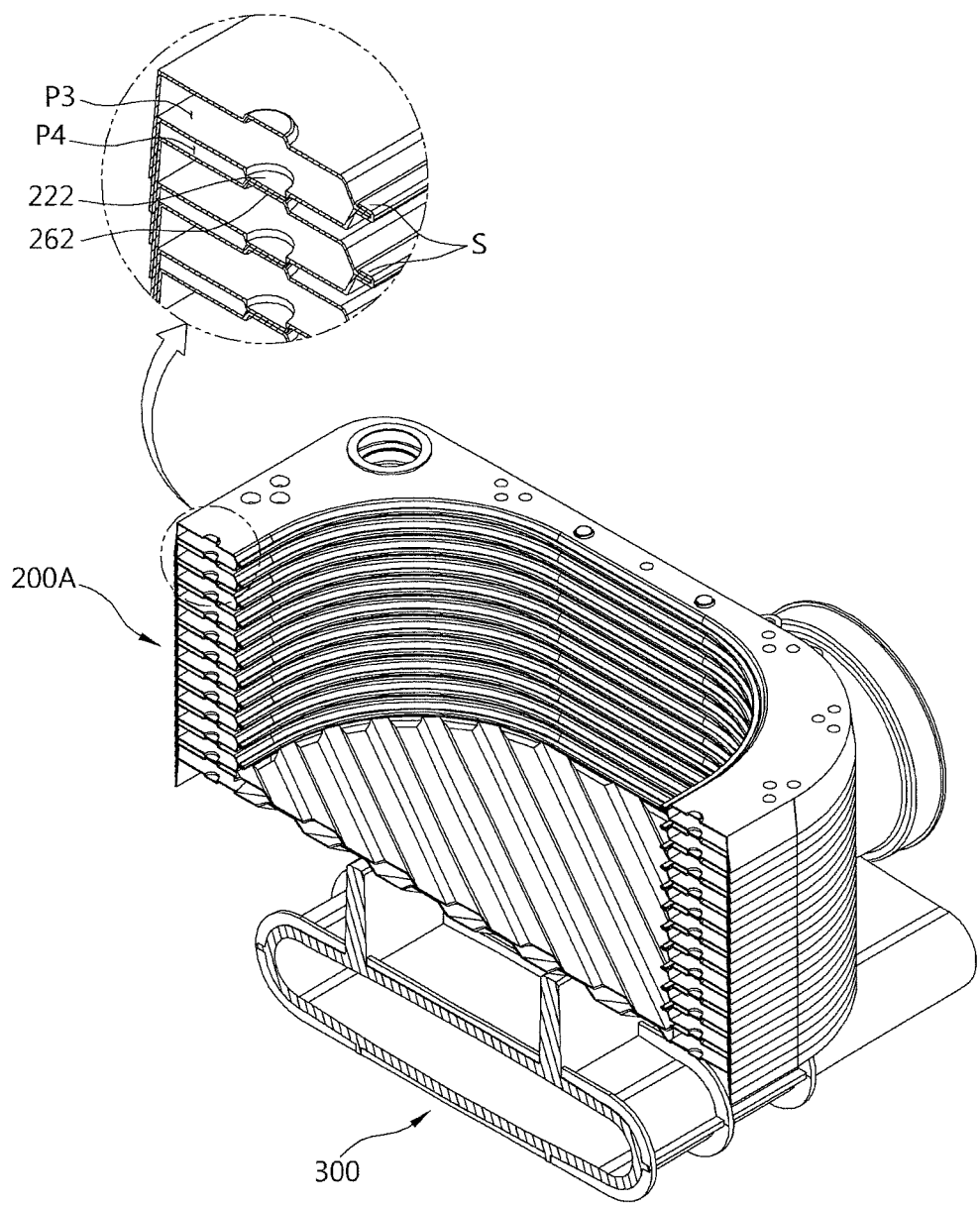

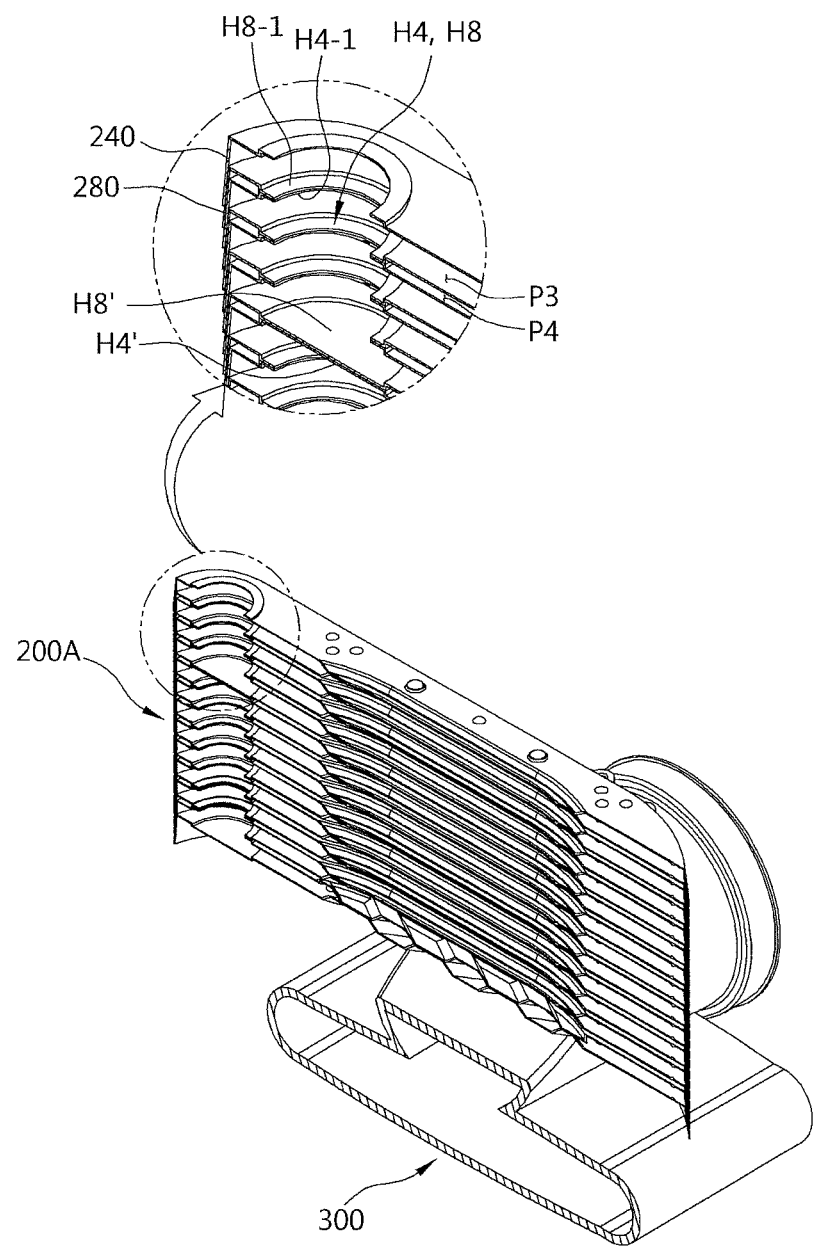

[FIG. 14]
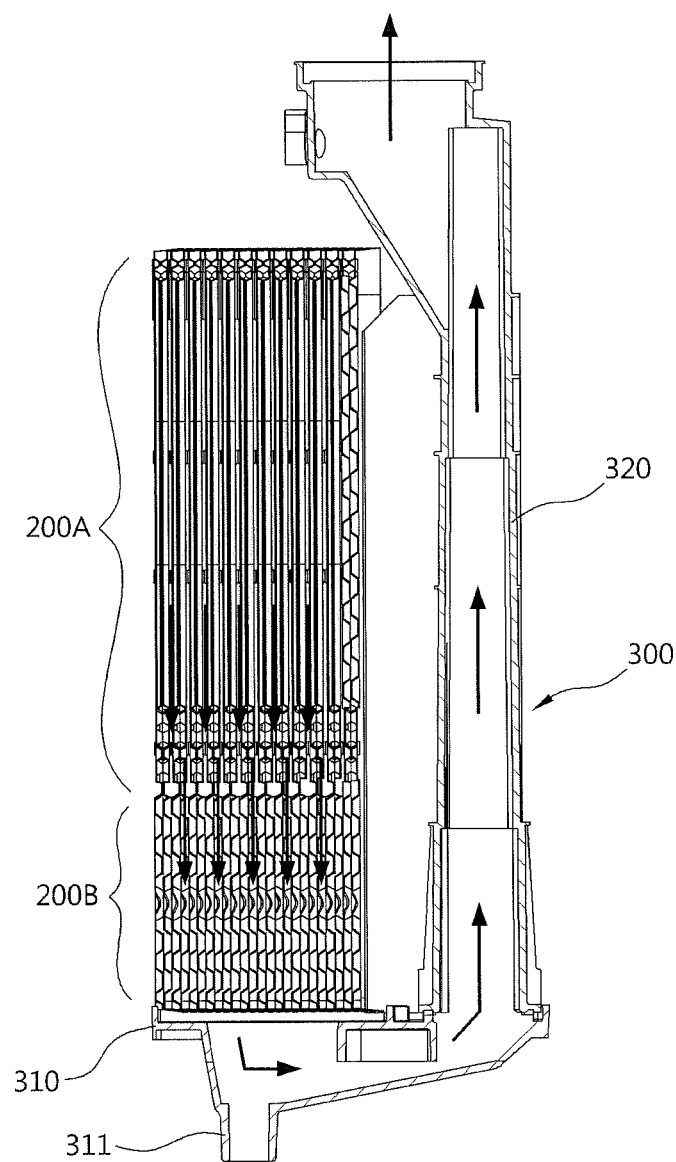

[FIG. 15]
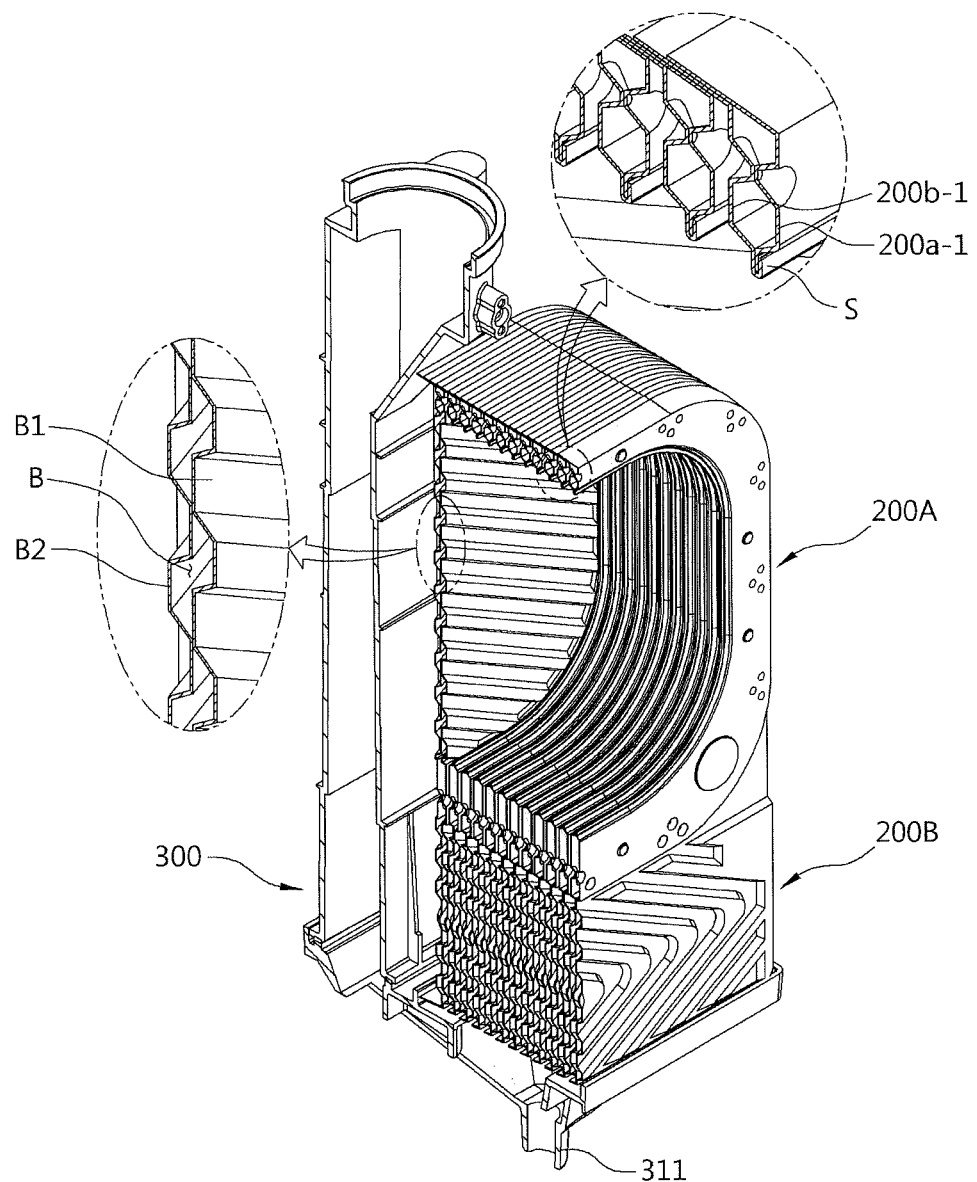

[FIG. 16]
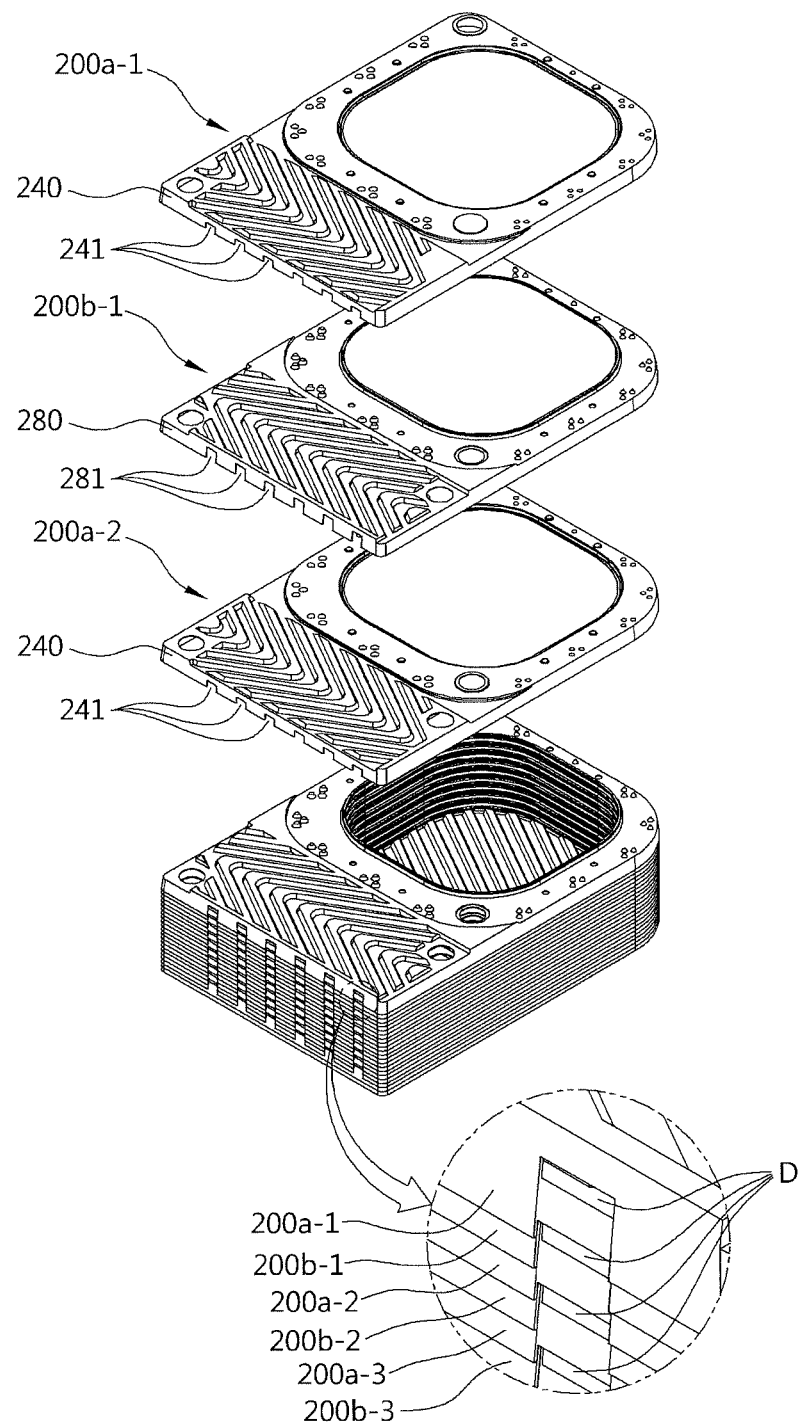

[FIG. 17]
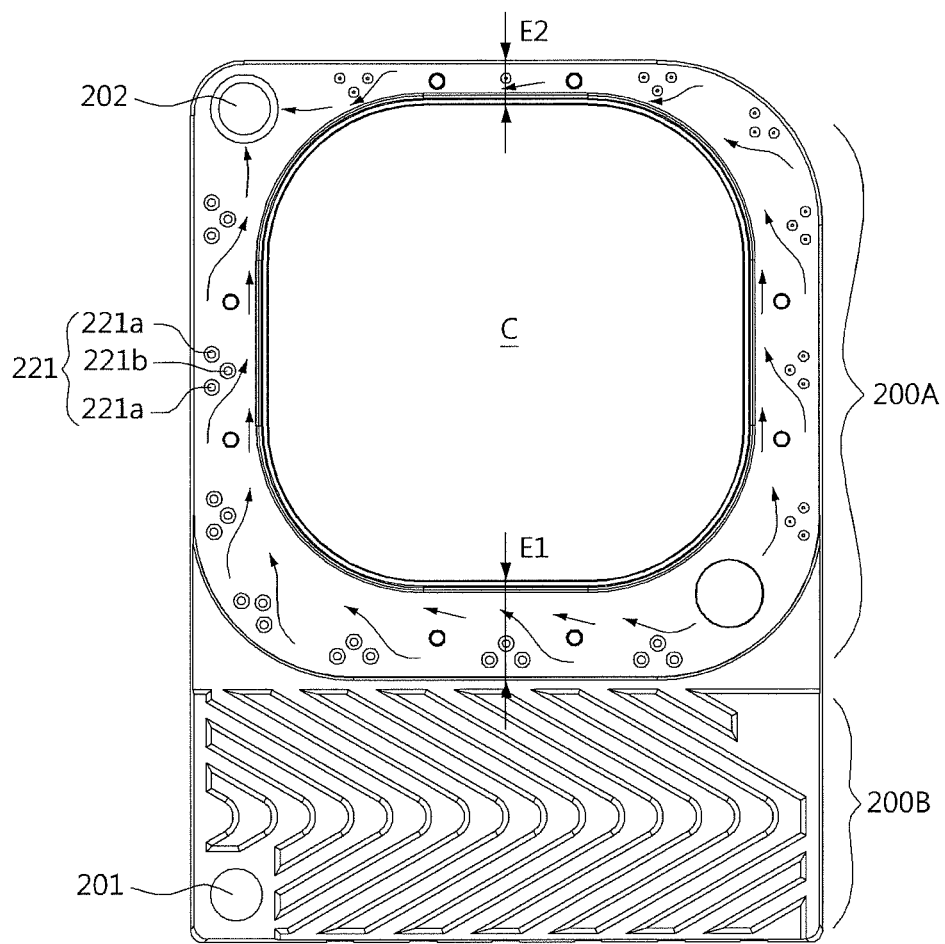

[FIG. 18]
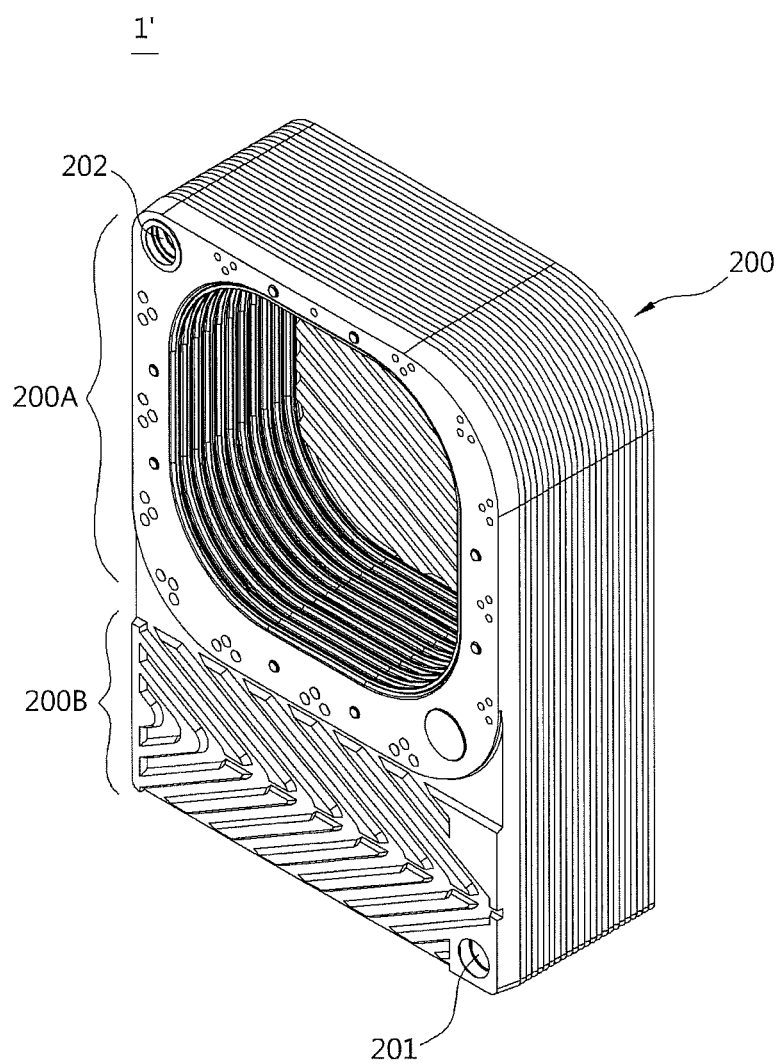

[FIG. 19]
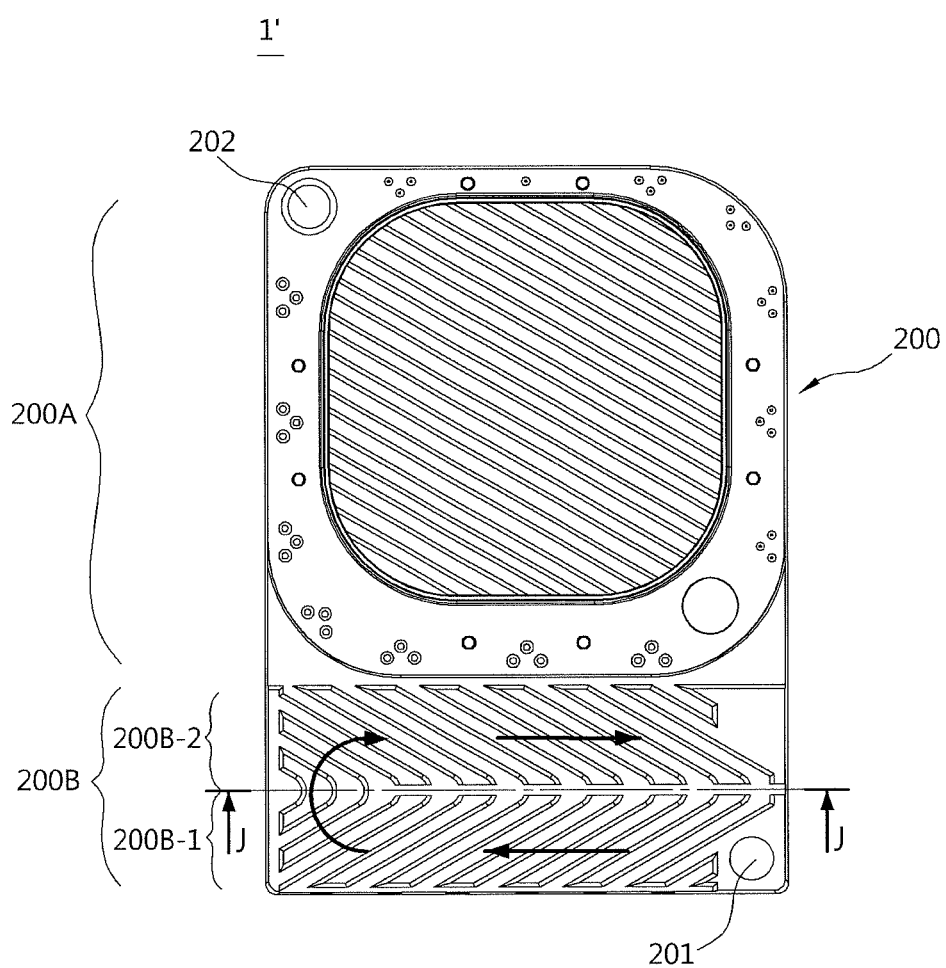

[FIG. 20]
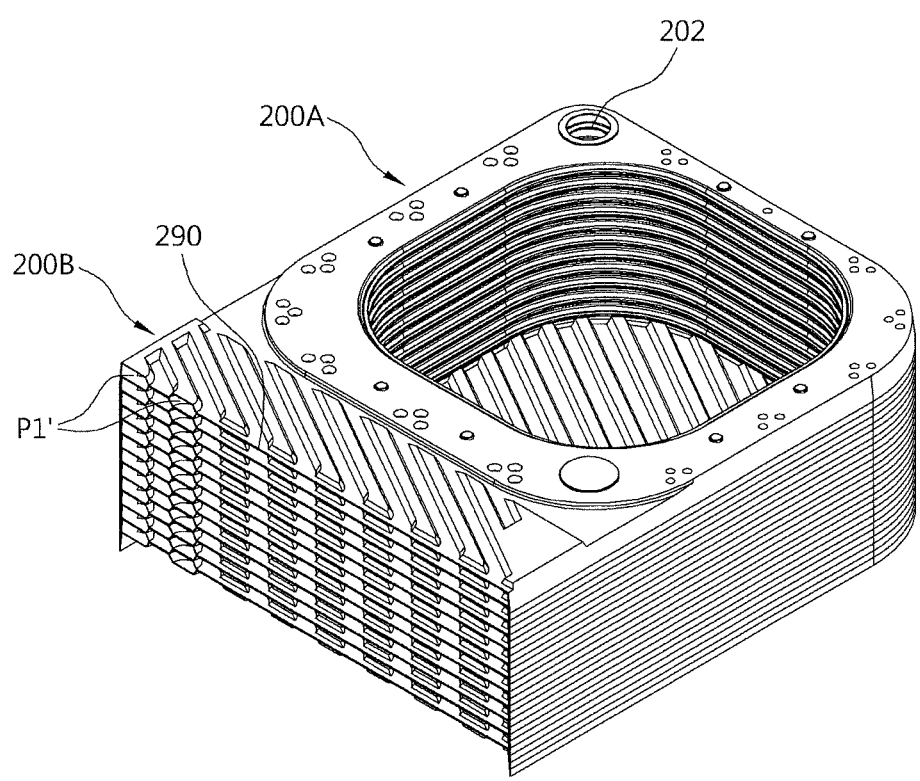

HEAT EXCHANGER

CROSS-REFERENCE TO RELATED APPLICATIONS

This application is a national stage of International Application No. PCT/KR2016/008845, filed Aug. 11, 2016, which claims the benefit of Korean Application No. 10-2015-0121959, filed Aug. 28, 2015, in the Korean Intellectual Property Office, the disclosures of which are incorporated herein in their entireties by reference.

TECHNICAL FIELD

The present invention relates to a heat exchanger, and more particularly, to a heat exchanger having a simplified assembly structure due to stacking of a plurality of unit plates to integrally form a sensible heat portion and a latent heat portion, and capable of securing a wide heat transfer area between a heating medium and a combustion gas by reducing flow resistance of the heating medium and forming a long flow path for the heating medium in a limited space.

BACKGROUND ART

A boiler used for heating or warm water is a device configured to heat a desired area or supply warm water by heating water or direct water (hereinafter referred to as a "heating medium") being heated by a heat source, and the boiler includes a burner configured to combust a mixture of a gas and air and a heat exchanger configured to transfer combustion heat of a combustion gas to the heating medium.

Boilers produced in an early on used a heat exchanger which heats a heating medium using only sensible heat generated when a burner performs a combustion operation, but a condensing boiler, which has a sensible heat exchanger configured to absorb sensible heat of a combustion gas generated in a combustion chamber, and a latent heat exchanger configured to absorb latent heat generated by condensation of water vapor contained in the combustion gas which underwent heat exchange in the sensible heat exchanger, is recently being used to improve thermal efficiency. Such a condensing boiler is being applied to an oil boiler as well as a gas boiler, thereby contributing to an increase in boiler efficiency and a reduction in fuel cost.

As described above, a conventional condensing type heat exchanger including a sensible heat exchanger and a latent heat exchanger is configured with a structure in which a blower, a fuel supply nozzle, and a burner are installed above a housing, and the sensible heat exchanger and the latent heat exchanger, which each have a heat exchange fin coupled to an outer side of a heat exchange tube, are sequentially installed inside the housing below the burner.

However, in the conventional condensing type heat exchanger, there is a problem in that a volume of the heat exchanger is increased due to the blower being disposed above the housing and the structures of the sensible heat exchanger and the latent heat exchanger which are individually installed inside the housing.

As prior art for improving heat exchange efficiency and minimizing a volume while resolving such a problem, Korean Registered Patent No. 10-0813807 discloses a heat exchanger configured with a burner disposed at a central portion of the heat exchanger, and with a heat exchange tube wound around a circumference of the burner in the form of a coil.

The heat exchanger disclosed in the above-described patent has problems in that the tube is deformed into a rounded shape when the tube is formed into a flat shape and a pressure is applied to a heat transfer medium portion, and a thickness of the tube is to be thick since the tube is manufactured by being rolled up.

Further, the conventional heat exchanger is configured with a structure in which a heat exchange tube is wound around a combustion chamber in the form of a coil, and a heating medium flows in only one direction along the heat exchange tube such that there is a disadvantage of being unable to secure a wide heat transfer area since a heat exchange between a combustion gas and the heating medium is performed only in a local space formed around the heat exchanger in the form of a coil.

DISCLOSURE

Technical Problem

The present invention has been proposed to resolve the above-described problems, and it is an objective of the present invention to provide a heat exchanger having improved heat efficiency by reducing flow resistance of a heating medium and forming a long flow path for the heating medium in a limited space, thereby securing a wide heat transfer area between the heating medium and a combustion gas.

Technical Solution

To achieve the above-described objectives, a heat exchanger of the present invention includes a heat exchange portion (200) in which heating medium flow paths through which a heating medium flows in a space between a plurality of plates and combustion gas flow paths through which a combustion gas combusted in a burner (100) flows are alternately formed to be adjacent to each other, wherein the heat exchange portion (200) is configured with a sensible heat portion (200A) configured to surround an outer side of a combustion chamber (C), configured with an area at one side of a plate, and configured to heat the heating medium using sensible heat of the combustion gas generated by the combustion in the burner (100); and a latent heat portion (200B) configured with an area at the other side of the plate and configured to heat the heating medium using latent heat of water vapor contained in the combustion gas which underwent heat exchange in the sensible heat portion (200A), and a connection passage for the heating medium is formed between the sensible heat portion (200A) and the latent heat portion (200B), the latent heat portion (200B) is configured with a heating medium inlet (201) into which the heating medium flows, and with a plurality of latent heat portion heating medium flow paths (P1) formed between a plurality of plates and configured to communicate with the heating medium inlet (201) in parallel thereto, and the sensible heat portion (200A) is configured with a heating medium outlet (202) through which the heating medium flows and a plurality of sensible heat portion heating medium flow paths (P3) formed between the plurality of plates and connected in series between the plurality of latent heat portion heating medium flow paths (P1) and the heating medium outlet (202).

Advantageous Effects

In accordance with a heat exchanger of the present invention, a plurality of unit plates manufactured in similar patterns are stacked to integrally form a latent heat portion having multiple parallel heating paths and a sensible heat portion having serial heating medium flow paths, so that flow resistance of a heating medium is reduced and a maximally long flow path for the heating medium is formed in a limited space such that heat efficiency between the heating medium and a combustion gas can be maximized.

DESCRIPTION OF DRAWINGS

FIG. 1 is a perspective view of a heat exchanger according to one embodiment of the present invention.

FIG. 2 is a right side view of the heat exchanger according to one embodiment of the present invention.

FIG. 3 is a front view of the heat exchanger according to one embodiment of the present invention.

FIG. 4 is an exploded perspective view of the heat exchanger according to one embodiment of the present invention.

FIG. 5 is an enlarged perspective view of a portion of a unit plate shown in FIG. 4.

FIG. 6 is a perspective view illustrating a flow path of a heating medium passing through a latent heat portion and a sensible heat portion.

FIG. 7 is a perspective view taken along line A-A of FIG. 3.

FIG. 8 is a perspective view taken along line B-B of FIG. 3.

FIG. 9 is a perspective view taken along line C-C of FIG. 3.

FIG. 10 is a perspective view taken along line D-D of FIG. 3.

FIG. 11 is a perspective view taken along line E-E of FIG. 3.

FIG. 12 is a perspective view taken along line F-F of FIG. 3.

FIG. 13 is a perspective view taken along line G-G of FIG. 3.

FIG. 14 is a perspective view taken along line H-H of FIG. 3.

FIG. 15 is a perspective view taken along line I-I of FIG. 3.

FIG. 16 is a perspective view illustrating a state in which a combustion gas pass-through portion is formed at a lower portion of the latent heat portion.

FIG. 17 is a diagram illustrating a state in which the heating medium is guided in a direction toward an inner side of a combustion chamber by a guide portion.

FIG. 18 is a perspective view of a heat exchanger according to another embodiment of the present invention.

FIG. 19 is a front view of FIG. 18.

FIG. 20 is a perspective view taken along line J-J of FIG. 19.

DESCRIPTION OF REFERENCE NUMERALS

| | |
|---|---|
| 1 and 1': heat exchangers | 100: burner |
| 200: heat exchange portion | 200A: sensible heat portion |
| 200B: latent heat portion | 200B-1: first latent heat portion |
| 200B-2: second latent heat portion | 200-1 to 200-12: unit plates |
| 200A-1 to 200a-12: first plates | 200b-1 to 200b-12: second plates |
| 200-A: first plate group | 200-B: second plate group |
| 200-C: third plate group | 201: heating medium inlet |
| 202: heating medium outlet | 210: first plane portion |

-continued

| | |
|---|---|
| 220: first protrusion | 221: first guide portion |
| 222: first gap maintaining portion | 230: second protrusion |
| 240: first flange | 241: first incised portion |
| 250: second plane portion | 260: first recess |
| 261: second guide portion | |
| 262: second gap maintaining portion | |
| 270: second recess | 280: second flange |
| 281: second incised portion | |
| 290: heating medium blocking portion | |
| 300: combustion gas discharge portion | 310: lower cover |
| 311: condensation discharge pipe | |
| 320: combustion gas discharge pipe | |
| A1: first opening | A2: second opening |
| B: water housing cooling portion | B1: first insulating plate |
| B2: second insulating plate | C: combustion chamber |
| D: combustion gas pass-through portion | H1 to H8: through-holes |
| H3' and H7': first blocked portions | |
| H4' and H8': second blocked portions | |
| H3-1 and H4-1: first flanges | H7-1 and H8-1: second flanges |
| P1: latent heat portion heating medium flow path | |
| P1': heating medium connection passage | |
| P2: latent heat portion combustion gas flow path | |
| P3: sensible heat portion heating medium flow path | |
| P4: sensible heat portion combustion gas flow path | |

MODES OF THE INVENTION

Hereinafter, configurations and operations for preferred embodiments of the present disclosure will be described in detail with reference to the accompanying drawings.

Referring to FIGS. 1 to 6, a heat exchanger 1 according to one embodiment of the present invention includes a burner 100 configured to combust a mixture of air and fuel to generate combustion heat and a combustion gas; a heat exchange portion 200 provided at a circumference of the burner 100 to perform a heat exchange between a heating medium and the combustion gas generated by the combustion in the burner 100, and constituted by stacking a plurality of plates; and a combustion gas discharge portion 300 configured to discharge a combustion gas which passes through the heat exchange portion 200.

The burner 100 is a cylindrical burner and is assembled by being inserted into a space of a combustion chamber C provided at the heat exchange portion 200 in a horizontal direction at a front surface, thereby improving convenience of detaching the burner 100 and maintenance work of the heat exchanger 1.

The heat exchange portion 200 is configured with a sensible heat portion 200A configured to surround an outer side of the combustion chamber C and configured to form one side area of each of the plurality of plates and heat the heating medium using sensible heat of the combustion gas generated by the combustion of the burner 100; and a latent heat portion 200B configured to form the other side area of each of the plurality of plates and heat the heating medium using latent heat generated when water vapor contained in the combustion gas which underwent heat exchange in the sensible heat portion 200A is condensed.

The plurality of plates are disposed in an upright structure and stacked in a front-rear direction to allow the sensible heat portion 200A to be disposed at a top part and the latent heat portion 200B to be disposed at a bottom part.

The combustion gas discharge portion 300 is configured with a lower cover 310 covering a lower portion of the latent heat portion 200B, and with a combustion gas discharge pipe 320 having a side connected to the lower cover 310 and extending upward. A condensation discharge pipe 311 configured to discharge condensation generated at the latent heat portion 200B is connected to a lower portion of the lower cover 310.

Configurations and operations of the plurality of plates, the sensible heat portion 200A, and the latent heat portion 200B, which constitute the heat exchange portion 200, will be described below.

The heat exchange portion 200 is configured such that the plurality of plates are stacked from a front side to a rear side, and the sensible heat portion 200A disposed at the top part and the latent heat portion 200B disposed at the bottom part are integrally formed with the plurality of plates.

As one example, the plurality of plates may be configured with first to twelfth unit plates 200-1, 200-2, 200-3, 200-4, 200-5, 200-6, 200-7, 200-8, 200-9, 200-10, 200-11, and 200-12, and the unit plates are configured with first plates 200a-1, 200a-2, 200a-3, 200a-4, 200a-5, 200a-6, 200a-7, 200a-8, 200a-9, 200a-10, 200a-11, and 200a-12, which are disposed at front sides of the unit plates, and with second plates 200b-1, 200b-2, 200b-3, 200b-4, 200b-5, 200b-6, 200b-7, 200b-8, 200b-9, 200b-10, 200b-11, and 200b-12, which are disposed at back sides of the unit plates.

Referring to FIGS. 7 to 13, a latent heat portion heating medium flow path P1 and a sensible heat portion heating medium flow path P3 are formed between the first plate and the second plate constituting each of the unit plates, and a latent heat portion combustion gas flow path P2 and a sensible heat portion combustion gas flow path P4 are formed between a second plate constituting a unit plate disposed at one side of unit plates stacked adjacent to each other and a first plate constituting a unit plate disposed at the other side thereof.

Referring to FIGS. 4 and 5, the first plate is configured with a first plane portion 210; a first protrusion 220 protruding from one side of the first plane portion 210 toward the front side, having a central portion at which a first opening A1 is formed, and configured to constitute the sensible heat portion 200A; a second protrusion 230 protruding from the other side of the first plane portion 210 toward the front side and configured to form the latent heat portion 200B; and a first flange 240 bent at an edge of the first plate toward the rear side.

In the first plate 200a-1 disposed at the foremost position of the first plate, a heating medium inlet 201 is formed at one side of the lower portion of the latent heat portion 200B, and a heating medium outlet 202 is formed at one side of an upper portion of the sensible heat portion 200A.

In first plates 200a-2 to 200a-12 of the first plate, which are sequentially stacked at the rear side of the first plate 200a-1 disposed at the foremost position, a first through-hole H1 is formed at the one side of the lower portion of the latent heat portion 200B, a second through-hole H2 is formed at one side of an upper portion of the latent heat portion 200B, a third through-hole H 3 is formed at one side of a lower portion of the sensible heat portion 200A, and a fourth through-hole H 4 is formed at the other side of the upper portion of the sensible heat portion 200 A.

The second plate is configured with a second plane portion 250; a first recess 260 recessed at one side of the second plane portion 250 toward the rear side, having a central portion at which a second opening A2 corresponding to the first opening A1 is formed, and configured to form the sensible heat portion heating medium flow path P3 between the first protrusion 220 and the first recess 260; a second recess 270 recessed at the other side of the second plane portion 250 toward the rear side and configured to form the latent heat portion heating medium flow path P1 between the second protrusion 230 and the second recess 270; and a second flange 280 bent at an edge of the second plate toward the rear side.

In the second plate, a fifth through-hole H5 is formed at the one side of the lower portion of the latent heat portion 200B, a sixth through-hole H6 is formed at the one side of the upper portion of the latent heat portion 200B, a seventh through-hole H7 is formed at the one side of the lower portion of the sensible heat portion 200A, and an eighth through-hole H8 is formed on the other side of the upper portion of the sensible heat portion 200A.

Further, first blocked portions H3' and H7' are respectively formed at the other side of the lower portion of the sensible heat portion 200A in the first plate 200a-9 of the ninth unit plate 200-9 and the second plate 200b-8 of the eighth unit plate 200-8, and second blocked portions H4' and H8' are respectively formed at the one side of the upper portion of the sensible heat portion 200A in the first plate 200a-5 of the fifth unit plate 200-5 and the second plate 200b-4 of the fourth unit plate 200-4. The first blocked portions H3' and H7' and the second blocked portions H4' and H8' are configured to change a flow path of the heating medium passing through the sensible heat portion heating medium flow path P3 to form a serial flow path, and operations thereof will be described below.

Meanwhile, referring to FIGS. 10 and 13, first flanges H3-1 and H4-1 are respectively formed at the through-holes H3 and H4 to protrude toward the sensible heat portion combustion gas flow path P4, and second flanges H7-1 and H8-1 are respectively formed at the through-holes H7 and H8 to protrude toward the sensible heat portion combustion gas flow path P4 and to be in contact with ends of the first flanges H3-1 and H4-1.

According to the configurations of the first flanges H3-1 and H4-1 and the second flanges H7-1 and H8-1, the sensible heat portion heating medium flow path P3 and the sensible heat portion combustion gas flow path P4 are spatially separated and a gap between the sensible heat portion heating medium flow path P3 and the sensible heat portion combustion gas flow path P4 may also be constantly maintained.

Further, referring to FIGS. 4 and 15, a water housing cooling portion B, which is configured to provide a heating medium connection passage to direct the heating medium which passes through the heating medium flow path of the latent heat portion 200B so that the heating medium flows into the heating medium flow path of the sensible heat portion 200A and to insulate the combustion chamber C, is formed behind the sensible heat portion 200A.

The water housing cooling portion B is configured such that the heating medium is filled in a space between a first insulating plate B1 formed at the first plate 200a-12 of the unit plate 200-12 disposed at the rearmost position, and a second insulating plate B2 formed at the second plate 200b-12 of the unit plate 200-12. Protrusions and recesses, which each have a comb shape, may be formed to intersect each other on the first insulating plate B1 and the second insulating plate B2, and thus turbulence is generated in a flow of the heating medium passing through the water housing cooling portion B.

According to the configuration of the water housing cooling portion B, heat insulation of the combustion chamber C is possible without separate insulation being installed to prevent overheating of the heat exchanger 1, and thus a wide heating medium connection passage configured to connect the latent heat portion heating medium flow path P1 and the sensible heat portion heating medium flow path P3 may be secured in a space between the first insulating plate B1 and the second insulating plate B2 such that flow path resistance of the heating medium can be reduced. Further, the sensible heat portion heating medium flow path P3 through which the heating medium flows is provided at an outer wall surrounding the combustion chamber C and thus heat insulation of the outer wall of the combustion chamber C is possible such that the heat insulation of the combustion chamber C may be achieved over an entire area thereof by the water housing cooling portion B and the sensible heat portion heating medium flow path P3.

Meanwhile, the second protrusion 230 and the second recess 270 may be formed in comb shapes bent in opposite directions. In this case, when the first plate and the second plate are stacked, the first plane portion 210 and the second plane portion 250 are in contact, the latent heat portion heating medium flow path P1 through which the heating medium flows is formed between the second protrusion 230 and the second recess 270 which are bent in the opposite directions in a single unit plate, and the latent heat portion combustion gas flow path P2 through which the combustion gas flows is formed between the second recess 270 of one of adjacently stacked unit plates and the second protrusion 230 of the other adjacently stacked unit plate.

As described above, the second protrusion 230 and the second recess 270 are configured to be in comb shapes bent in the opposite directions, and thus turbulence is generated in a flow of the heating medium passing through the latent heat portion heating medium flow path P1 and in a flow of the combustion gas passing through the latent heat portion combustion gas flow path P2 such that heat exchange efficiency can be increased.

Referring to FIGS. 7 and 16, when the first plate and the second plate are stacked, the first flange 240 and the second flange 280 partially overlap each other, and the overlapping portions are weld-coupled such that an outer wall of the heat exchange portion 200 is formed.

Further, in a state in which the first flange 240 and the second flange 280 of adjacent plates overlap each other, a combustion gas pass-through portion D through which the combustion gas flowing in the latent heat portion combustion gas flow path P2 passes toward the combustion gas discharge portion 300 is formed at some portions of the plurality of plates.

To this end, a plurality of first incised portions 241 are formed at a combustion gas discharge side of the first flange 240, a plurality of second incised portions 281 are formed at a combustion gas discharge side of the second flange 280, and the combustion gas pass-through portion D is formed at some portions of the first incised portion 241 and the second incised portion 281 when the first plate and the second plate are stacked.

The combustion gas pass-through portion D is formed at the lower portion of the latent heat portion 200B to be spaced a predetermined distance apart from each other in a lateral direction and a longitudinal direction, and thus the combustion gas which passes through the latent heat portion 200B may be distributed and discharged in a uniform flow rate across the entire lower area of the latent heat portion 200B such that the combustion gas pass-through portion D serves to prevent noise and vibration and reduce flow resistance of the combustion gas passing through the latent heat portion 200B and discharged to the combustion gas discharge portion 300.

Meanwhile, guide portions 221 and 261 configured to guide the heating medium to flow toward the center of the combustion chamber C are formed at the heating medium flow path P3 of the sensible heat portion 200A. A plurality of guide portions 221 and a plurality of guide portions 261 are formed and spaced apart from each other at an outer side portion of the sensible heat portion 200A in a circumferential direction thereof.

Here, the outer side portion of the sensible heat portion 200A is an area between an intermediate portion and an outer end of the sensible heat portion 200A in a width direction, and refers to an area adjacent to the outer end thereof.

The guide portions 221 and 261 include the plurality of first guide portions 221 protruding from the first plate toward the sensible heat portion heating medium flow path P3, and include the plurality of second guide portions 261 protruding from the second plate toward the sensible heat portion heating medium flow path P3 and formed at positions corresponding to the plurality of guide portions 221.

Referring to FIGS. 11 and 17, a protruding end of the first guide portion 221 and a protruding end of the second guide portion 261 are in contact with each other to enhance coupling strength between the first plate and the second plate.

The first guide portion 221 may be configured with a first guide 221a disposed on a front side on the basis of a flow direction of the heating medium, a second guide 221b disposed to be spaced apart in a diagonal direction from a rear side of the first guide 221a toward the combustion chamber C, and a third guide 221c disposed to be spaced apart from a rear side of the guide 221a, and the second guide portion 261 may also be configured to correspond to the first guide portion 221.

With such configurations of the guide portions 221 and 261, as indicated by arrows in FIG. 17, since a flow path of the heating medium flowing along the sensible heat portion heating medium flow path P3 is guided by the guide portions 221 and 261 in a direction toward the combustion chamber C, a distance between the burner 100 installed inside the combustion chamber C and the heating medium is shortened so that combustion heat of the burner 100 can be effectively transferred to the heating medium and generation of turbulence is promoted in the flow of the heating medium such that heat transfer efficiency can be improved.

Referring to FIG. 12, a plurality of first gap maintaining portions 222 protruding toward the sensible heat portion combustion gas flow path P4 are formed at the first protrusion 220, and a plurality of second gap maintaining portions 262 are formed at the first recess 260 at positions corresponding to the plurality of first gap maintaining portions 222 to protrude toward the sensible heat portion combustion gas flow path P4. A protruding end of the first gap maintaining portion 222 and a protruding end of the second gap maintaining portion 262 are formed to be in contact with each other.

With such configurations of the first gap maintaining portion 222 and the second gap maintaining portion 262, a gap of the sensible heat portion combustion gas flow path P4 along with the configurations of the first flanges H3-1 and H4-1 and the second flanges H7-1 and H8-1, which are described below, may be constantly maintained, and the coupling strength between the first plate and the second plate may be enhanced.

Meanwhile, in order to form a local laminar flow in the combustion gas flowing through the sensible heat portion combustion gas flow path P4 to improve heat exchange efficiency between the combustion gas and the heating medium, a gap, which is a vertically spaced distance, of the sensible heat portion combustion gas flow path P4 is preferably set to be in a range of 0.8 to 1.6 mm.

Further, as shown in FIGS. 11, 12, and 15, one of the ends of the first plate and the second plate, which are disposed at the circumference of the combustion chamber C, is bent, seamed, and weld-coupled to be in close contact with the other end. In this case, a length of a seamed end S of the first plate and the second plate is preferably set to be in a range of 1 to 5 mm to prevent overheating of the seamed end S and maintain welding quality.

Meanwhile, referring to FIG. 17, a width E1 of a side area facing the latent heat portion 200B is preferably formed to be greater than a width E2 of a side area opposite the latent heat portion 200B among areas of the plate constituting the sensible heat portion 200A. This is because most of the combustion gas generated in the combustion chamber C flows toward the latent heat portion 200B, and thus the width E1 of the side area facing the latent heat portion 200B is formed to be greater than the width E2 of the side area opposite the latent heat portion 200B to secure a wider heat transfer area in a region in which a heat exchange is actively performed.

Flow paths of the combustion gas and the heating medium in the heat exchanger 1 according to the present invention will be described below.

The flow path of the combustion gas will be described first with reference to FIG. 14. In FIG. 14, arrows indicate a flow direction of the combustion gas.

The combustion gas generated by the combustion in the burner 100 flows radially outward inside the combustion chamber C and passes through the sensible heat portion combustion gas flow path P4 formed between the unit plates of the sensible heat portion 200A, and sensible heat of the combustion gas is transferred to the heating medium passing through the sensible heat portion heating medium flow path P3 while the combustion gas passes through the sensible heat portion combustion gas flow path P4.

A combustion gas flowing downward via the sensible heat portion combustion gas flow path P4 flows downward through the latent heat portion combustion gas flow path P2 formed between the unit plates of the latent heat portion 200B, and latent heat of condensation contained in water vapor of the combustion gas is transferred to the heating medium passing through the latent heat portion heating medium flow path P1 to preheat the heating medium while the combustion gas flows downward through the latent heat portion combustion gas flow path P2.

A combustion gas reaching a lower portion of the latent heat portion combustion gas flow path P2 passes through the plurality of combustion gas pass-through portions D which are formed at the lower portion of the latent heat portion 200B at regular intervals, and is discharged downward. At this point, since the combustion gas is distributed and discharged at a uniform flow rate across the entire lower area of the latent heat portion 200B due to the plurality of combustion gas pass-through portions D formed at regular intervals, a phenomenon in which the combustion gas is biased to one side is prevented such that the flow resistance of the combustion gas can be reduced, and generation of noise and vibration can also be minimized.

The combustion gas passing through the plurality of combustion gas pass-through portions D is discharged upward through the lower cover 310 and the combustion gas discharge pipe 320, and condensation is discharged through the condensation discharge pipe 311 connected to the lower portion of the lower cover 310.

The flow path of the heating medium will be described below with reference to FIGS. 4 and 6. In FIGS. 4 and 6, arrows indicate a flow direction of the heating medium.

The flow path of the heating medium in the latent heat portion 200B will be described first.

A heating medium flowing into the heating medium inlet 201 formed at the first plate 200a-1, which is disposed at a front surface of the plurality of plates, sequentially passes through the first through-hole H1 and the fifth through-hole H5 respectively formed at the plurality of plates 200b-1 to 200a-12, which are stacked behind the first plate 200a-1, to flow toward the water housing cooling portion B provided between the first plate 200a-12 and the second plate 200b-12 of the unit plate 200-12 disposed at the rearmost position. Further, some flow amount of the heating medium sequentially passing through the first through-hole H1 and the fifth through-hole H5 passes through the latent heat portion heating medium flow path P1 provided inside each of the unit plates 200-1 to 200-11 in a parallel structure, sequentially passes through the second through-hole H2 and the sixth through-hole H6 which are diagonally disposed with respect to the first through-hole H1 and the fifth through-hole H5, respectively, and flows toward the water housing cooling portion B provided between the first plate 200a-12 and the second plate 200b-12.

As described above, since the heating medium flow paths of the latent heat portion 200B are provided in a multiple parallel structure, flow resistance of the heating medium passing through the latent heat portion heating medium flow path P1 is reduced, and, since the latent heat portion heating medium flow path P1 and the latent heat portion combustion gas flow path P2 are alternately disposed to be adjacent to each other, the heating medium passing through the latent heat portion heating medium flow path P1 may be preheated by effectively absorbing the latent heat of the water vapor contained in the combustion gas.

Next, the flow path of the heating medium in the sensible heat portion 200A will be described.

The heating medium which passes through the water housing cooling portion B absorbs heat transferred to the rear side of the combustion chamber C, and then sequentially passes through a third through-hole H3 formed at the first plate 200a-12 of the twelfth unit plate 200-12 and third through-holes H3 and seventh through-holes H7 formed at the plates 200b-11 to 200b-9 stacked in front of the twelfth unit plate 200-12.

Further, since the first blocked portions H3' and H7' are formed at the plates 200a-9 and 200b-8 stacked at the front side, some of the heating medium sequentially passing through the third through-holes H3 and the seventh through-holes H7 and flowing into the sensible heat portion heating medium flow path P3 formed at each of the unit plates 200-12 to 200-9 branches off in both directions, flows in the directions toward the fourth through-hole H4 and the eighth through-hole H8 which are respectively disposed to be diagonal to the third through-hole H3 and the seventh through-hole H7, and then sequentially passes through the fourth through-hole H4 and the eighth through-hole H8 to flow to the front side.

The heating medium which passes through the fourth through-hole H4 and the eighth through-hole H8 of the plates 200a-9 and 200b-8 sequentially passes through a fourth through-hole H4 and an eighth through-hole H8 which are respectively formed at the plates 200a-8 to 200b-5 sequentially stacked in front of the plates 200a-9 and 200b-8.

Further, since the second blocked portions H4' and H8' are formed at the plates 200a-5 and 200b-4 stacked at the front side, some of the heating medium sequentially passing through the fourth through-holes H4 and the eighth through-holes H7 and flowing into the sensible heat portion heating medium flow path P3 formed at each of the unit plates 200-8 to 200-5 branches off in both directions, flows in directions toward the third through-hole H3 and the seventh through-hole H7 which are respectively disposed to be diagonal to the fourth through-hole H4 and the eighth through-hole H8, and then sequentially passes through the third through-hole H3 and the seventh through-hole H7 to flow to the front side.

The heating medium which passes through the third through-hole H3 and the seventh through-hole H7 of the plates 200a-5 and 200b-4 sequentially passes through the third through-hole H3 and the seventh through-hole H7 which are respectively formed at the plates 200a-4 to 200b-1 sequentially stacked in front of the plates 200a-5 and 200b-4.

Further, since portions of the plate 200a-1 disposed at the foremost position and corresponding to the third through-hole H3 and the seventh through-hole H7 are blocked, some of the heating medium sequentially passing through the third through-holes H3 and the seventh through-holes H7 and flowing into the sensible heat portion heating medium flow path P3 formed at each of the unit plates 200-4 to 200-1 branches off in both directions, flows in directions toward the fourth through-hole H4 and the eighth through-hole H8 which are respectively disposed diagonal to the third through-hole H3 and the seventh through-hole H7, and then sequentially passes through the fourth through-hole H4 and the eighth through-hole H8 to be discharged through the heating medium outlet 202 formed at the plate 200a-1 disposed at the foremost position.

FIG. 6 illustrates the above-described flow paths of the heating medium in the latent heat portion 200B and the sensible heat portion 200A as a unit of a plate group, and in the present embodiment, an example in which a first plate group 200-A, a second plate group 200-B, and a third plate group 200-C, which are each configured with a set of eight plates, are configured from the front side to the rear side, has been described, but the total number of stacked plates and the number of plates constituting each of the plate groups in the present invention may be changed and implemented.

As described above, since the flow paths of the heating medium in the sensible heat portion 200A are configured to be connected in series, the flow path of the heating medium may be formed to be maximally long within a limited space of the sensible heat portion 200A such that heat exchange efficiency between the heating medium and the combustion gas can be significantly improved.

A configuration of a heat exchanger 1' according to another embodiment of the present invention will be described below with reference to FIGS. 18 to 20.

The heat exchanger 1' according to the present embodiment differs from the heat exchanger 1 according to the above-described embodiment in terms of a heating medium flow path of a latent heat portion 200B, and the other configurations thereof are the same as those of heat exchanger 1. Therefore, the same reference numerals are assigned to members the same as those of the above-described embodiment, and descriptions thereof will be omitted.

In the heat exchanger 1' according to the present embodiment, the latent heat portion 200B is divided into a first latent heat portion 200B-1 and a second latent heat portion 200B-2 on both sides of a heating medium blocking portion 290, and heating medium flow paths of the first latent heat portion 200B-1 and the second latent heat portion 200B-2 are configured in a communicating structure using a heating medium connection passage P1' formed at one side of the heating medium blocking portion 290.

Through-holes H1 and H5 communicating with a heating medium inlet 201 and a heating medium flow path of the first latent heat portion 200B-1 are formed at one side of a lower portion of the first latent heat portion 200B-1, and through-holes H2 and H6 communicating with a heating medium flow path of the second latent heat portion 200B-2 and a sensible heat portion heating medium flow path P3 are formed at one side of an upper portion of the second latent heat portion 200B-2.

With such a configuration, as indicated by arrows in FIG. 19, a heating medium flowing in through the heating medium inlet 201 moves to one side along the heating medium flow path of the first latent heat portion 200B-1, passes through the heating medium connection passage P1', is reversed in its flow direction to move to the other side along the heating medium flow path of the second latent heat portion 200B-2, and then flows along a water housing cooling portion B and the sensible heat portion heating medium flow path P3 as described in the above-described embodiment.

According to the present embodiment, the heating medium flow path in the latent heat portion 200B can be formed to be longer than in the above-described embodiment, and thus absorption efficiency of latent heat can be further improved.

The invention claimed is:

1. A heat exchanger comprising:
a heat exchange portion (200) in which a heating medium flow path through which a heating medium flows in a space between a plurality of plates and combustion gas flow paths through which a combustion gas combusted in a burner (100) flows are alternately formed to be adjacent to each other,
wherein the heat exchange portion (200) is configured with a sensible heat portion (200A) configured to surround an outer side of a combustion chamber (C), configured with an area at one side of a plate, and configured to heat the heating medium using sensible heat of the combustion gas generated by the combustion in the burner (100); and a latent heat portion (200B) configured with an area at the other side of the plate and configured to heat the heating medium using latent heat of water vapor contained in the combustion gas which underwent heat exchange in the sensible heat portion (200A),
a connection passage for the heating medium is formed between the sensible heat portion (200A) and the latent heat portion (200B),
the latent heat portion (200B) is configured with a heating medium inlet (201) into which the heating medium flows, and with a plurality of latent heat portion heating medium flow paths (P1) formed between a plurality of plates and configured to communicate with the heating medium inlet (201) in parallel thereto, and
the sensible heat portion (200A) is configured with a heating medium outlet (202) through which the heating medium flows, and with a plurality of sensible heat portion heating medium flow paths (P3) formed between the plurality of plates and connected in series between the plurality of latent heat portion heating medium flow paths (P1) and the heating medium outlet (202).

2. The heat exchanger of claim 1, wherein:
a plurality of plates are formed by stacking a plurality of unit plates in each of which a first plate and a second plate are stacked,
the heating medium flow path is formed between the first plate and the second plate of the unit plate, and
the combustion gas flow path is formed between a second plate constituting a unit plate disposed at one side of adjacently stacked unit plates and a first plate of a unit plate disposed at the other side thereof.

3. The heat exchanger of claim 2, wherein:
the first plate is configured with a first plane portion (210); a first protrusion (220) protruding from one side of the first plane portion (210) to a front side and having a first opening (A1) formed at a center of the first protrusion (220) to constitute the sensible heat portion (200A); and a second protrusion (230) protruding from the other side of the first plane portion (210) to the front side and configured to form the latent heat portion (200B), and
the second plate is configured with a second plane portion (250); a first recess (260) recessed at one side of the second plane portion (250) toward the rear side, configured to form a sensible heat portion heating medium flow path (P3) between the first protrusion (220) and the first recess (260), and having a second opening (A2) corresponding to the first opening (A1); and a second recess (270) recessed at the other side of the second plane portion (250) toward the rear side and configured to form a latent heat portion heating medium flow path (P1) between the second protrusion (230) and the second recess (270).

4. The heat exchanger of claim 3, wherein, when the first plate and the second plate are stacked, the first plane portion (210) and the second plane portion (250) are in contact with each other, and the second protrusion (230) and the second recess (270) are configured to be in comb shapes bent in opposite directions.

5. The heat exchanger of claim 3, wherein:
a plurality of first gap maintaining portions (222) are formed at the first protrusion (220) to protrude toward the combustion gas flow path, and
a plurality of second gap maintaining portions (262) are formed at the first recess (260) at positions corresponding to the plurality of first gap maintaining portions (222) to protrude toward the combustion gas flow path.

6. The heat exchanger of claim 5, wherein a protruding end of each of the plurality of first gap maintaining portions (222) and a protruding end of each of the plurality of second gap maintaining portions (262) are formed to be in contact with each other.

7. The heat exchanger of claim 1, wherein:
a sensible heat portion combustion gas flow path (P4) is provided between the sensible heat portion heating medium flow paths (P3), and
a latent heat portion combustion gas flow path (P2) communicating with the sensible heat portion combustion gas flow path (P4) is provided between the latent heat portion heating medium flow paths (P1).

8. The heat exchanger of claim 1, wherein:
through-holes (H1) and (H5) provided at one side of the latent heat portion (200B) and through-holes (H2) and (H6) provided at the other side, which communicate with the latent heat portion heating medium flow paths (P1), are diagonally formed at the latent heat portion (200B) to connect the latent heat portion heating medium flow paths (P1) in parallel, and
through-holes (H3) and (H7) provided at one side of the sensible heat portion (200A) and through-holes (H4) and (H8) provided at the other side, which communicate with the sensible heat portion heating medium flow paths (P3), are diagonally formed at the sensible heat portion (200A) to connect the sensible heat portion heating medium flow paths (P3) in series.

9. The heat exchanger of claim 8, wherein:
a heating medium flowing into the sensible heat portion heating medium flow path (P3) through the through-holes (H3) and (H7) provided at the one side branches off in both directions and flows toward the through-holes (H4) and (H8) formed at the other side in a diagonal direction, and
the heating medium flowing into the sensible heat portion heating medium flow path (P3) through the through-holes (H4) and (H8) branches off in both directions and flows toward the through-holes (H3) and (H7) formed at the one side in the diagonal direction.

10. The heat exchanger of claim 9, wherein:
first blocked portions (H3') and (H7') configured to guide the heating medium, which flows into the sensible heat portion heating medium flow path (P3) through the through-holes (H3) and (H7) provided at the one side, to flow toward the through-holes (H4) and (H8) formed at the other side in the diagonal direction, and
second blocked portions (H4') and (H8') configured to guide the heating medium, which flows into the sensible heat portion heating medium flow path (P3) through the through-holes (H4) and (H8) provided at the other side, to flow toward the through-holes (H3) and (H7) formed at the one side in the diagonal direction are formed at the sensible heat portion (200A).

11. The heat exchanger of claim 8, wherein:
first flanges (H3-1) and (H4-2) are respectively formed at the through-holes (H3) and (H4) to protrude toward the combustion gas flow path, and
second flanges (H7-1) and (H8-1) are respectively formed at the through-holes (H7) and (H8) to protrude toward the combustion gas flow path and are in contact with ends of the first flanges (H3-1) and (H4-2).

12. The heat exchanger of claim 1, wherein:
the latent heat portion (200B) is divided into a first latent heat portion (200B-1) and a second latent heat portion (200B-2) on both sides of a heating medium blocking portion (290),
the heating medium flow paths of the first latent heat portion (200B-1) and the second latent heat portion (200B-2) communicate through a heating medium connection passage (P1') formed at one side of the heating medium blocking portion (290),
through-holes (H1) and (H5) communicating with the heating medium inlet (201) and the heating medium flow path of the first latent heat portion (200B-1) are formed at one side of the first latent heat portion (200B-1), and
through-holes (H2) and (H6) communicating with the heating medium flow path of the second latent heat portion (200B-2) and the sensible heat portion heating medium flow path (P3) are formed at one side of the second latent heat portion (200B-2).

13. The heat exchanger of claim 12, wherein:
a heating medium flowing into the sensible heat portion heating medium flow path (P3) through the through-holes (H3) and (H7) provided at the one side branches off in both directions and flows toward the through-holes (H4) and (H8) formed at the other side in a diagonal direction, and the heating medium flowing into the sensible heat portion heating medium flow path (P3) through the through-holes (H4) and (H8) branches off in both directions and flows toward the through-holes (H3) and (H7) formed at the one side in the diagonal direction.

\* \* \* \* \*